(12) United States Patent
Goldstein et al.

(10) Patent No.: US 6,396,873 B1
(45) Date of Patent: May 28, 2002

(54) OPTICAL DEVICE

(75) Inventors: Michael D. Goldstein, Herzlia; Avi Yaron, Givataim; Shay Ghilai, Tel Aviv, all of (IL)

(73) Assignee: Envision Advanced Medical Systems, Petah-Tiqua (IL)

( * ) Notice: Subject to any disclaimer, the term of this patent is extended or adjusted under 35 U.S.C. 154(b) by 0 days.

(21) Appl. No.: 09/257,850

(22) Filed: Feb. 25, 1999

(51) Int. Cl.[7] .................................. H04B 1/66
(52) U.S. Cl. ............... 375/240; 250/201.7; 250/201.8; 250/204; 359/465; 396/113; 396/116
(58) Field of Search .......................... 375/240; 348/51, 348/58, 45, 751; 340/700; 356/4; 358/98, 44

(56) References Cited

U.S. PATENT DOCUMENTS

| | | | |
|---|---|---|---|
| 2,639,653 A | 5/1953 | Fischer | 95/18 |
| 4,414,470 A * | 11/1983 | Nakaoka | 250/204 |
| 4,437,764 A * | 3/1984 | Levine et al. | 358/44 |
| 4,873,572 A * | 10/1989 | Miyazaki et al. | 358/98 |
| 4,959,641 A * | 9/1990 | Bass et al. | 340/700 |
| 5,034,805 A * | 7/1991 | Ishizaka | 358/44 |
| 5,076,687 A * | 12/1991 | Adelson | 356/4 |
| 5,428,386 A | 6/1995 | D'Alfonso et al. | 348/45 |
| 5,527,263 A | 6/1996 | Zobel et al. | 600/166 |
| 5,552,840 A * | 9/1996 | Ishii et al. | 348/751 |
| 5,588,948 A | 12/1996 | Takahashi et al. | 600/111 |
| 5,594,497 A | 1/1997 | Ahem et al. | 71/348 |
| 5,603,687 A | 2/1997 | Hori et al. | 600/166 |
| 5,606,455 A * | 2/1997 | Eichenlaub | 348/51 |
| 5,613,936 A | 3/1997 | Czamek et al. | 600/166 |
| 5,743,846 A | 4/1998 | Takahashi et al. | 600/166 |
| 5,743,847 A | 4/1998 | Nakamura et al. | 600/166 |
| 5,751,341 A | 5/1998 | Chaleki et al. | 348/65 |
| 5,760,827 A | 6/1998 | Faris | 348/42 |
| 5,776,049 A | 7/1998 | Takahashi | 600/111 |
| 5,800,341 A | 9/1998 | McKenna | 600/109 |
| 5,825,534 A | 10/1998 | Strähle | 359/376 |
| 5,828,487 A | 10/1998 | Greening et al. | 359/466 |
| 5,868,664 A | 2/1999 | Speier et al. | 600/112 |
| 5,991,074 A * | 11/1999 | Nose et al. | 348/58 |

* cited by examiner

*Primary Examiner*—Chris Kelley
*Assistant Examiner*—Shawn S. An
(74) *Attorney, Agent, or Firm*—Merchant & Gould PC

(57) ABSTRACT

Stereoscopic device including a lenticular lens layer and light sensor array, the lenticular lens layer includes a plurality of lenticular elements, the sight sensor array includes a plurality of light sensors, wherein selected ones of the light sensors detect light at a predetermined range of wavelengths and wherein at least selected others of the light sensors detect light at at least another predetermined range of wavelengths and wherein each of the lenticular elements is located in front of a selected group of the light sensors, thereby directing light from different directions to different light sensors within the selected group of the light sensors.

69 Claims, 11 Drawing Sheets

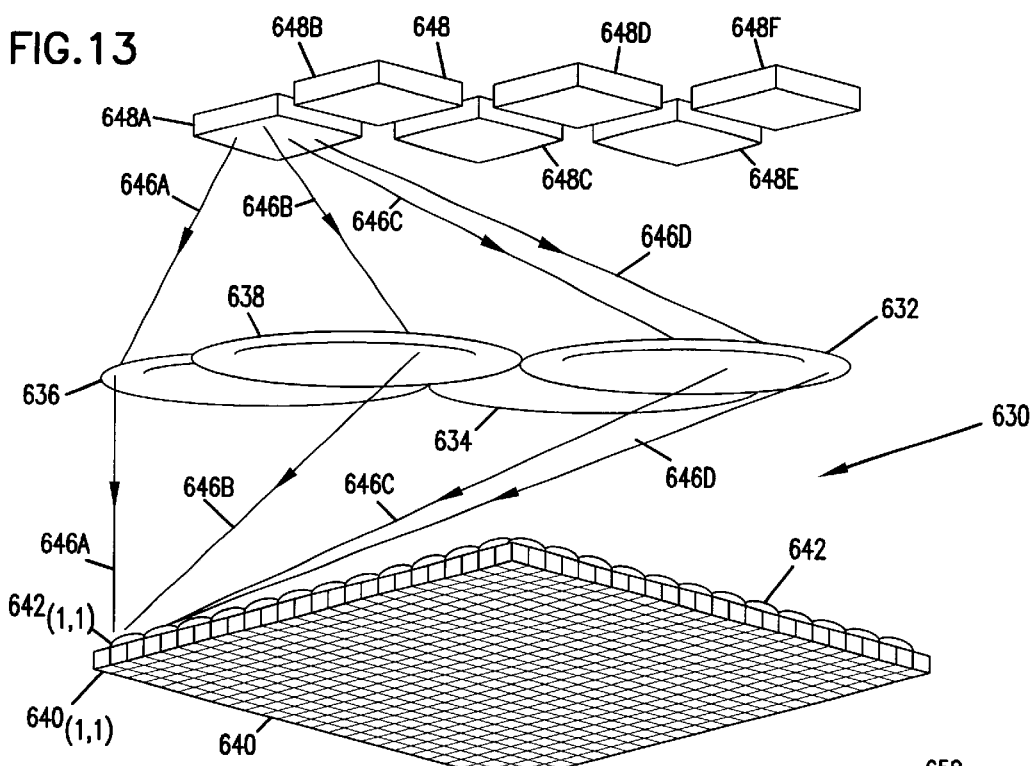
FIG. 13
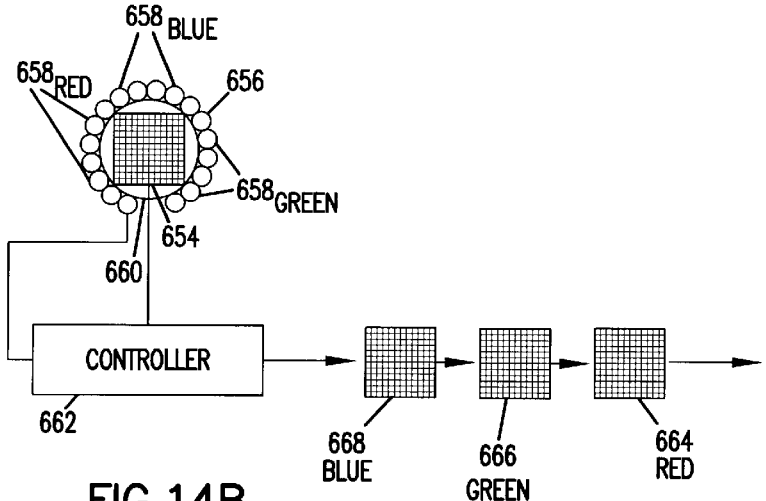
FIG. 14A
FIG. 14B
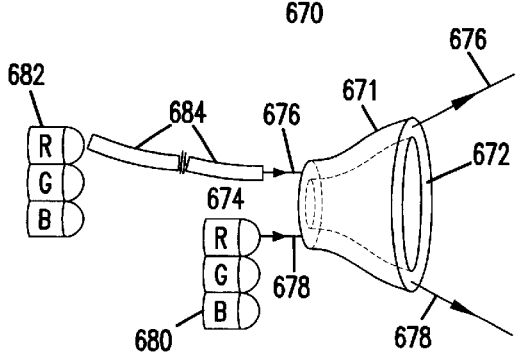
FIG. 15

OPTICAL DEVICE

FIELD OF THE INVENTION

The present invention relates to endoscopes, microscopes and boroscopes, in general and to stereoscopic image pick up devices with color imaging capability, in particular.

BACKGROUND OF THE INVENTION

Stereoscopic image detection devices are known in the art. Such devices are required to obtain and provide a combination of small cross section and high image quality. It will be appreciated by those skilled in the art that high image quality, in general, is characterized by stereoscopic vision accuracy, color capabilities, high resolution and illumination requirements.

It is noted that conventional methods, which provide stereoscopic images, require a wider optical path than a monocular one. Such a widened optical path enlarges the cross-section required for the detection device considerably. Hence, the requirement for a small cross section is not maintained.

U.S. Pat. No. 5,527,263 to Zobel et al., is directed to a dual optical path stereo endoscope with simple optical adjustment. U.S. Pat. No. 5,776,049 to Takahashi, is directed to a "Stereo Endoscope Imaging Apparatus" and provides a device which utilizes a combination of two optical paths with two CCD units, capable of variable zoom.

Auto-stereoscopic devices, which utilize one optical system to provide a stereo effect, are also known in the art. Such a device is provided in U.S. Pat. No. 5,603,687 to Hori et al., which is directed to a device with two parallel optical axis and two CCD elements. Hori selected an asymmetrical approach, wherein one optical channel has a large aperture for light and details and the other optical channel provides a parallax image for stereoscopic imagery to the proximal CCD.

U.S. Pat. No. 5,613,936 to Czarnek et al., is directed to a stereoscopic endoscope device which utilizes light polarization and time multiplexing in order to transmit each different polarized image corresponding to left and right images multiplexed in time, through one optical channel that transfers images from the lateral side of the endoscope shaft. This endoscope has to be inserted deeper into the human cavity to receive a stereo image. It must also be used with a head mounted display device called "switched shutter glasses" that causes eye irritation. it is noted Fat according to Czamek each image is received in 25% of original quality. As much as 50% of the light received from the object, is lost due to polarization considerations and as much as 50% of the remaining information is lost due to channel switching.

U.S. Pat. No. 5,588,948, to Takahashi et al., is directed to a Stereoscopic Endoscope. The stereo effect is produced by having a dividing pupil shutter, which splits the optical path onto the left and right sides, and the up and down sides. These sides are alternatively projected on a proximal image pick up device, using time multiplexing. According to another aspect of this reference a distal CCD is included, which is divided to left and right sides with a shading member separating them, for achieving space multiplexing.

U.S. Pat. No. 5,743,847 to Nakamura et al, is directed to a "Stereoscopic Endoscope Having Image Transmitting Optical-System And Pupil Dividing Unit That Are Axially Movable With Respect To Each Other", which uses a plural pupil dividing means and one optical channel. U.S. Pat. No. 5,751,341 to Chaleki et al, is directed to a "stereoscopic endoscope system", which is basically a two channel endoscope, with one or two proximal image sensors. A rigid sheath with an angled distal tip could be attached to its edge and be rotated, for full view.

U.S. Pat. No. 5,800,341 to Mckenna et al, who is directed to an "Electronically Steerable Endoscope", which provides different fields of view, without having to move the endoscope, using a plurality of CCD cells and processing means. U.S. Pat. No. 5,825,534 to Strahle, is directed to a "Stereo Endoscope having a Folded Sight Line" including stereo-endoscope optical channel, having a sight line folded relative to tube axis.

U.S. Pat. No. 5,828,487 to Greening et al, is directed to a "stereoscopic viewing system using a two dimensional lens system" which in general, provides an alternative R-L switching system. This system uses a laterally moving opaque leaf, between the endoscope and the camera, thus using one imaging system. U.S. Pat. No. 5,594,497 to Ahem, describes a distal color CCD, for monocular view in an elongated tube.

The above descriptions provide examples of auto-stereoscopic inventions, using different switching techniques (Time division multiplexing) and polarization of channels or pupil divisions (spatial multiplexing), all in an elongated shaft. When color image pick up devices are used within these descriptions, the system suffers from reduced resolution, loss of time related information or a widened cross section.

The issue of color imagery or the issue of a shaft-less endoscope is not embedded into any solution.

To offer higher flexibility and to reduce mechanical and optical constraints it is desired to advance the image pick-up device to the frontal part of the endoscope. This allows much higher articulation and lends itself easily to a flexible endoscope. Having a frontal pick up device is in compromise with having a high resolution color device due to size constraints (at this time).

U.S. Pat. No. 5,076,687 to Edelson, is directed to an "Optical Ranging Apparatus" which is, in general a depth measuring device utilizing a lenticular lens and a cluster of pixels.

U.S. Pat. No. 5,760,827 to Faris, is directed to "Pixel data processing system and for producing spectrally multiplexed images of three-dimensional imagery for use in viewing thereof" and demonstrates the use of multiplexing in color and as such offers a solution for having a color stereo imagery with one sensor. Nevertheless, such a system requires several sequential passes to be acquired from the object, for creating a stereo color image.

SUMMARY OF THE PRESENT INVENTION

It is an object of the present invention to provide a novel system for stereoscopic imaging using a lenticular lens layer and a sensor array, and a novel method for operating the same, which overcome the disadvantages of the prior art.

In accordance with the present invention, mere is thus provided a stereoscopic device, which includes a lenticular lens layer and a color light sensor array. The lenticular layer includes a plurality of lenticular elements. Each of the lenticular elements is located in front of a selected group of the light sensors of the sensor array, thereby directing light from different directions to different light sensors within the selected group of the light sensors.

In accordance with a further aspect of the invention, there is provided a stereoscopic device, which includes a lenticular lens layer and a light sensor array, including a plurality of light sensors, where each of the light sensors detects light at a predetermined range of wavelengths.

The stereoscopic device according to the invention can be constructed as a large-scale device, such as a television camera or a small-scale device such as an endoscope.

In a stereoscopic device according to the invention, each of the lenticular elements includes light directing means, which distinguish between at least two directions of light. For example, each of the lenticular elements can be shaped in a general semi-cylindrical shape. Each of the lenticular elements can alternatively include light directing means, which distinguish between four directions of light. For example, such a lenticular element can be shaped in a general semispherical shape.

According to one aspect of the invention, each of the selected groups of the light sensors includes an even number of light sensors. According to another aspect of the invention, each of the selected groups of the light sensors includes an odd number of light sensors.

The stereoscopic device of the invention can further include an illuminating unit. This light illuminating unit can surround the lenticular lens layer. An illumination unit according to the invention includes a light source, a light distribution unit and light guiding means connected between the light source and the light dispersing unit. The light guiding means guides light from the light source to the light dispersing unit. According to one aspect of the invention, the light dispersing unit surrounds the lenticular lens layer.

The light illuminating unit can produce light in a predetermined range of wavelengths. According to another aspect of the invention, the light illuminating unit produces at least two alternating beams of light, where each of the beams of light is characterized as being in a different range of wavelengths.

The stereoscopic device according to the invention, can further include a controller connected to the array of light sensors. This controller produces an image for each of the different directions, by combining data received from the light sensors respective of each of the different directions.

This controller can be connected to the array of light sensors. Accordingly, the controller produces an image for each combination of a selected one of the different directions and a selected one of the beams of light, by combining data received from the light sensors respective of each of the different directions, with respect to Fe currently illuminating one of the beams of light.

The stereoscopic device according to the invention can further include capturing means, connected to the array of light sensors, for capturing data received from light sensors and a storage unit for storing the captured data. The stereoscopic device can further include a stereoscopic display unit, connected to the controller, for producing the image in a stereoscopic manner. The produced image can be partially stereoscopic.

The predetermined ranges of wavelengths, which are applicable for the light sensors as well as for the illumination light beams can be selected from the list consisting of substantially visible red color light, substantially visible green color light, substantially visible blue color light, substantially visible cyan color light, substantially visible yellow color light, substantially visible magenta color light, substantially infrared light, substantially ultra-violet light, visible light, and the like.

For example, either the light sensor array or the light beams can include a color combination of red-green-blue (RGB), cyan yellow magenta green (CYMG), a white light color combination and the like.

In accordance with a further aspect of the invention, there is thus provided a method for detecting a stereoscopic image. The method includes the steps of splitting light which arrives from different directions, using a lenticular lens layer, thereby producing at least two images, which are intertwined in a master image, and detecting the master image.

The method can further include the step of reconstructing each of the images from the master image. In addition the method can further include the step of displaying the images using a stereoscopic display device.

Further, the method can include the step of simultaneously displaying the images on a stereoscopic display device.

In addition, the method can further include the steps of sequentially illuminating a detected area with alternating beams of light, of different ranges of wavelength, and associating the master image in time, with the currently illuminating ranges of wavelength.

The step of reconstructing can include the steps of determining a range of wavelengths for each pixel within each one of the images, and determining an intensity level for each pixel within each one of the images.

The step of reconstructing can further include the steps of selecting one of the pixels, associated with a predetermined range of wavelengths, determining the pixels associated with another range of wavelengths, in the vicinity of the selected pixel, calculating an approximated level of the other range of wavelengths at the location of the selected pixel, and starting again from the step of selecting.

DESCRIPTION OF THE DRAWINGS

The present invention will be understood and appreciated more fully from the following detailed description taken in conjunction with the drawings in which:

FIG. 13 is a schematic illustration of a detection apparatus, constructed and operative in accordance with a further preferred embodiment of the present invention;

FIG. 14A is a partially schematic partially perspective illustration of a combined illumination and detection device, constructed and operative in accordance with the another preferred embodiment of the present invention;

FIG. 14B is a partially schematic partially perspective illustration of the combined illumination and detection device of FIG. 14A, a controller and output frames, constructed and operative in accordance with a further preferred embodiment of the present invention;

FIG. 15 is a illustration in perspective of an color illumination unit, constructed and operative in accordance with a further preferred embodiment of the present invention;

DETAILED DESCRIPTION OF PREFERRED EMBODIMENTS

The present invention overcomes the disadvantages of the prior art by providing a continuous vision stereoscopic apparatus, using a generally lenticular lens layer, a light sensor array and an image processing system.

Figure 1:
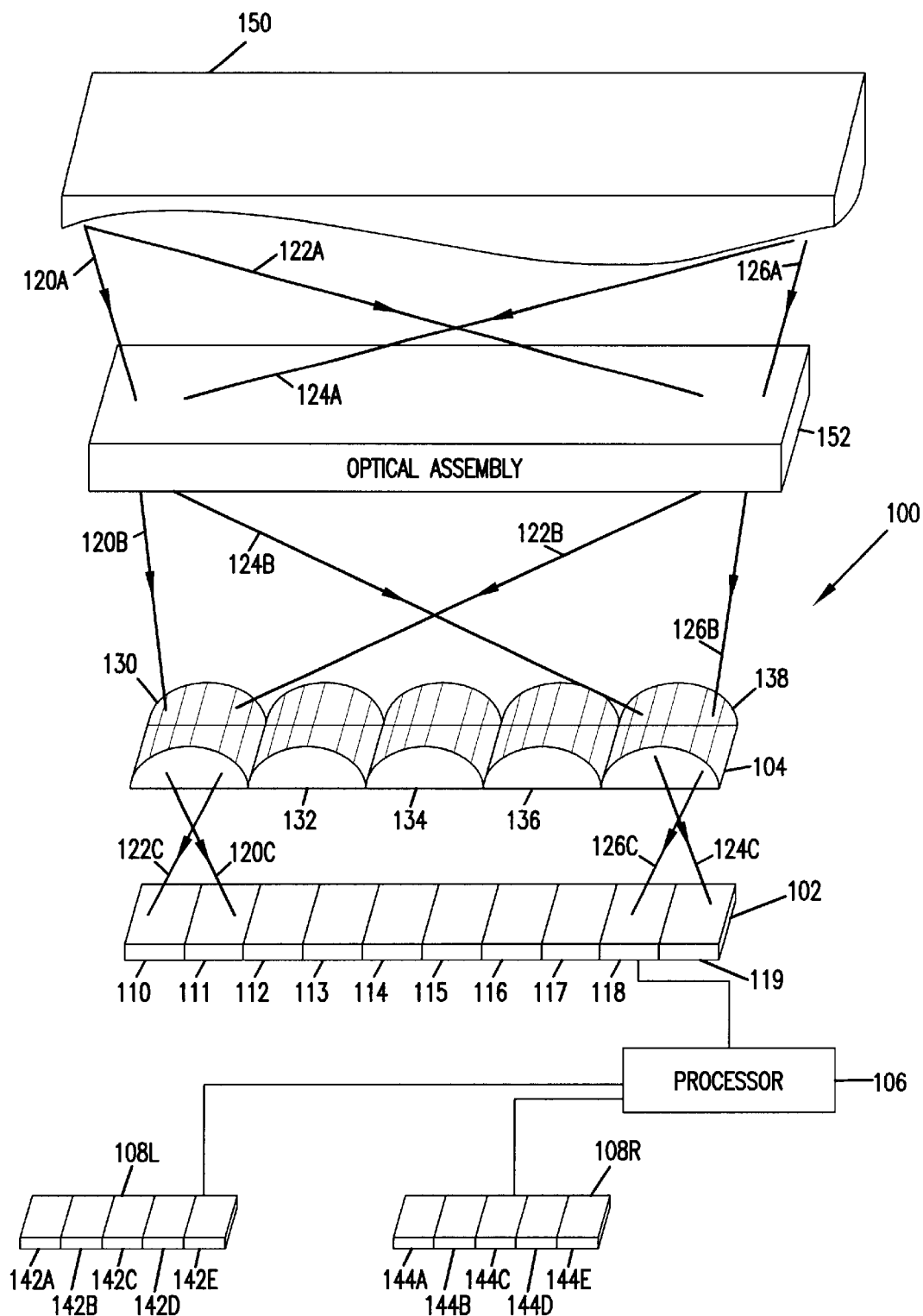
FIG. 1 is a schematic illustration of a three dimensional object and a stereoscopic vision apparatus, constructed and operative in accordance with a preferred embodiment of the present invention.

Reference is now made to FIG. 1, which is a schematic illustration of a three dimensional object and a stereoscopic vision apparatus, generally referenced 100 constructed and operative in accordance with a preferred embodiment of the present invention.

Apparatus 100 includes a lenticular lens layer 104, a light sensor array 102, a processor 106 and two display devices 108R and 108L. Apparatus 100 is placed in front of a three-dimensional object 150. An optical assembly 152 is placed been apparatus 100 and object 150, for focusing the image of object 150 on light sensor array 102.

Light sensor array 102 includes a plurality of sensors 110, 111, 112, 113, 114, 115, 116, 117, 118 and 119. Lenticular lens layer 104 includes a plurality of lenticular elements 130, 132, 134, 136 and 138. Each one of me lenticular elements is located above two light sensors, in a way that lenticular element 130 is located above sensors 110 and 111, lenticular element 132 is located above sensors 112 and 113, lenticular element 134 is located above sensors 114 and 115, lenticular element 136 is located above sensors 116 and 117 and lenticular element 138 is located above sensors 118 and 119.

The light sensors 110–119 detect light as directed by the lenticular lens elements 130–138 and provide respective information to the processor 106. The processor 106 processes this information, produces a pair of images, as will be explained in detail hereinbelow, and provides them to the display units 108R and 108L, which in turn produces visual representations of these images.

In general, each lenticular element directs light rays, which arrive tom a predetermined direction, to a predetermined location and light rays which arrive from another predetermined direction, to another predetermined location. Hence, the present invention, utilizes the lenticular lens layer to distinguish between a right view image and a left view image, as is described hereinbelow.

Each of the display units 108R and 108L includes a plurality of display units also known as pixels. Display unit 108L includes pixels 142A, 142B, 142C, 142D and 142E. Display unit 108R includes pixels 144A, 144B, 144C, 144D and 144E. Using these pixels each of the display units produces an image, according to data provided from the processor 106. The two images, each viewed by a different eye of the user, produce a sensation of a three dimensional image.

Light rays 124A, and 126A represent a right-side image of the three-dimensional object 150. Light rays 120A, and 122A represent a left side image of the three-dimensional object 150.

The optical assembly 152 redirects light rays 120A, 122A, 124A and 126A so as to focus them on a plain which is determined by the light sensor array 102, as light rays 120B, 122B, 124B and 126B, restively. Hence, Light rays 122B and 126B represent a focused left-side view of the three-dimensional object 150 and light rays and 120B 124B represent a focused right-side view of the three-dimensional object 150.

The lenticular lens layer 104 directs the focused left-side view light rays 122B and 126B to light sensors 110 and 118, respectively, as respective light rays 122C and 126C. In addition, the lenticular lens layer 104 directs the focused right side view light rays 120B and 124B to light sensors 111 and 119, respectively. In general, light sensors 111, 113, 115, 117 and 119 detect light rays which relate to a right side of view image of object 150 and light sensors were 110, 112, 114, 116, and 118, detect light rays which relate to a left side view image of object 150.

Hence, light sensors 110,112,114,116 and 118 detect the left side image of object 150 while light sensors 111, 113, 115, 117 and 119 detects the right side image of object 150. The light sensor array 102 provides data relating to the detected light intensity at each of the light sensors to the processor 106.

The processor processes this data, produces a right side image from the data relating to the right side image and a left side image from the data relating to the left side and provides the respective image to the respective display unit 108R and 108L.

In the present example, the processor 106 utilizes the data received from sensors 110, 112, 114, 116 and 118 to determine the data provided to pixels 144A, 144B, 144C, 144D and 144E. Similarly, the processor 106 utilizes the data received from sensors 111, 113, 115, 117 and 119 to determine the data which is to be provided to pixels 142A, 142B, 142C, 142D and 142E.

According to the present invention, the right side image and the left side image are detected at the same time and hence, can also be displayed at the same time.

According to another aspect of the present invention, each of the light sensors 110, 111, 112, 113, 114, 115, 116, 117, 118, and 119, include a plurality of color sensing elements, which together cover a predetermined spectrum, as will be described in detail herein below.

Figure 2:
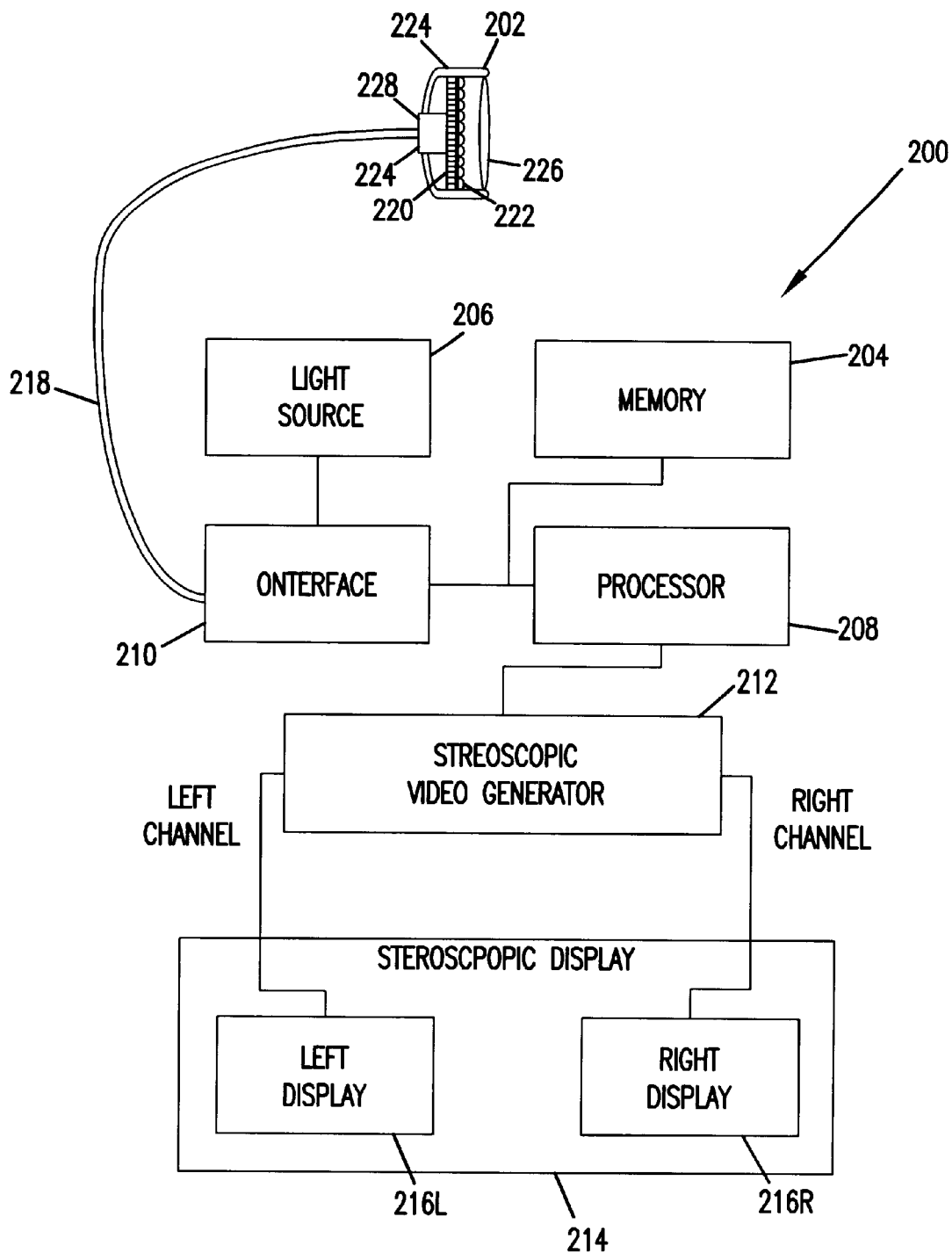
FIG. 2 is a schematic illustration of a stereoscopic vision apparatus, constructed and operative in accordance with another preferred embodiment of the present invention.

Reference is now made to FIG. 2, which is a schematic illustration of a stereoscopic vision apparatus, generally referenced 200 constructed and operative in accordance with another preferred embodiment of the present invention.

Apparatus 200 includes a sensor assembly 202, an interface 210, a processor 208, a light source 206, a memory unit 204, a stereoscopic video generator 212 and a stereoscopic display 214. The sensor assembly 202 is connected to the interface 210 using a flexible cord 218. The interface 210 is connected to processor 208, memory unit 204, and the light source 206. The processor 208 is further connected to the memory unit 204 and to the stereoscopic video generator 212. The stereoscopic video generator 212 is further connected to the stereoscopic display 214.

The sensor assembly 202 includes a focusing element, which in the present example is a lens 226, a lenticular lens layer 222, a light sensor array 220 an interface 228 and light projecting means 224. The lenticular lens layer 222 is attached to the light sensor array 220. According to the invention, the light sensor array 220 can be any type of sensing array, such as a CCD detector, a CMOS detector and the like. The light sensor array is connected to the interface 228, which can also acts as a supporting base.

The stereoscopic display 214 includes two display units, a left display unit 216L (for placing in front of the left eye of the user) and a right display unit 216R (for placing in front of the right eye of the user). Hence, the stereoscopic display 214 is capable of displaying stereoscopic images continuously. Such a stereoscopic display unit is for example the ProView 50 ST head mounted display, manufactured and sold by Kaiser Electro-Optics Inc., a US registered company, located in Carlsbad, Calif. Another example for a stereoscopic display unit is the virtual retinal display (VRD) unit, which is provided by MICROVISION Inc., a US registered company, located in Seattle, Wash. It is noted that any method, which is known in the art for displaying stereoscopic, and for that matter three-dimensional images, is applicable for the present invention.

The image received from a three dimensional object is received at the sensor assembly 202, focused by lens 226, optically passe by the lenticular lens layer 222 and finally detected by the light sensor array 220. The lenticular lens layer directs light coming from one predetermined direction to predetermined light sensors of the light sensor array 220 and light coming from another predetermined direction to other predetermined light sensors of the light sensor array 220. Accordingly, light sensor array 220 detects two images of the same object, a right side image and a left side image, each from a different direction. This aspect of the invention is described in detail hereinabove, in conjunction with FIG. 1.

An electronic representation of this information is partially processed by the interface 228 and then provided to the interface 210, via flexible cord 218.

It is noted that flexible cord 218 includes digital communication linking means such as optic fibers or electrical wires, for transferring data received from light sensor array 220 as well as light guiding conducting means for conducting light from light source 206 to the light projecting means 224. According to the present invention, flexible cord 218 can be replaced with a rigid cord (not shown), if necessary.

The data received at interface 210 includes information, which relates to the two images and has to be processed so as to distinguish them from each other. As the processor 208 processes the information it uses the memory unit 204 as temporarily storage.

After processing the information, the processor 208 produces two matrixes each being a reconstructed representation relating to one of the originally detected images. The processor provides these matrixes to the stereoscopic video generator 212, which in turn produces two respective video signals, one for the left view image and another for the right view image.

The stereoscopic video generator 212 provides the video signals to the stereoscopic display 214, which in turn produces two images, one using right display unit 216R and and another using left display unit 216L.

It is noted that the general size of the sensor assembly 202 is dictated by the size of the sensor array and can be in the order of a few millimeters or a few centimeters. This depends on the size of each of the sensors in the array and the total number of sensors (i.e. the required optical resolution).

According to one aspect of the invention, each of the sensors is a full range sensor, which yields data relating to a gray scale stereoscopic image. According to another aspect of the invention, each of the sensors can be adapted so as to provide full color detection capabilities.

Figure 3A:
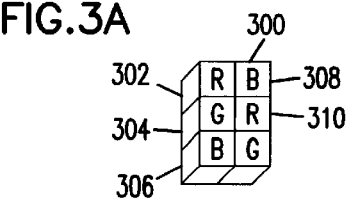
FIG. 3A is a schematic illustration of a super-pixel, constructed and operative in accordance with a further preferred embodiment of the present invention.

Reference is now made to FIG. 3A, which is a schematic illustration of a super-pixel, generally referenced 300, constructed and operative in accordance with a further preferred embodiment of the present inversion. Super-pixel 300 includes a left section of sensors which includes three sensors 302, 304 and 306 and a fight section of sensors which also includes three sensors 308, 310 and 312. Sensors 302 and 310 detect generally red colored light, sensors 304 and 312 detect generally green colored light and sensors 306 and 308 detect generally blue colored light. Hence, each of the sections includes a complete set of sensors for detecting light in entire visible spectrum.

Figure 3B:
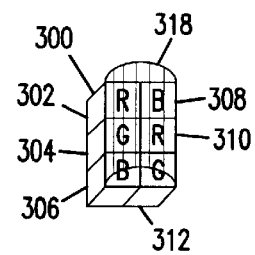
FIG. 3B is a schematic illustration of the super-pixel of FIG. 3A and a lenticular element, constructed and operative in accordance with a further preferred embodiment of the present invention.

Reference is further made to FIG. 3B, which is a schematic illusion of the super-pixel 300 of FIG. 3A and a lenticular element, generally referenced 318 constructed and operate in accordance with a further preferred embodiment of the present invention.

The lenticular element 318 is located on top of super-pixel 300, where its right side covers the right section of the super-pixel 300 and its left side covers the left section of the super-pixel 300. Accordingly, the lenticular element 318 directs light, which arrives from the left (right view image), to the left section of the super-pixel 300, where it is detected in full spectrum by sensors 302, 304 and 306. The data provided by these sensors can later be utilized to reconstruct an image in full color. Similarly, the lenticular element 318 directs light, which a from the right (left view image), to the right section of the super-pixel 300, where it is detected in full spectrum by sensors 308, 310 and 312.

Figure 3C:
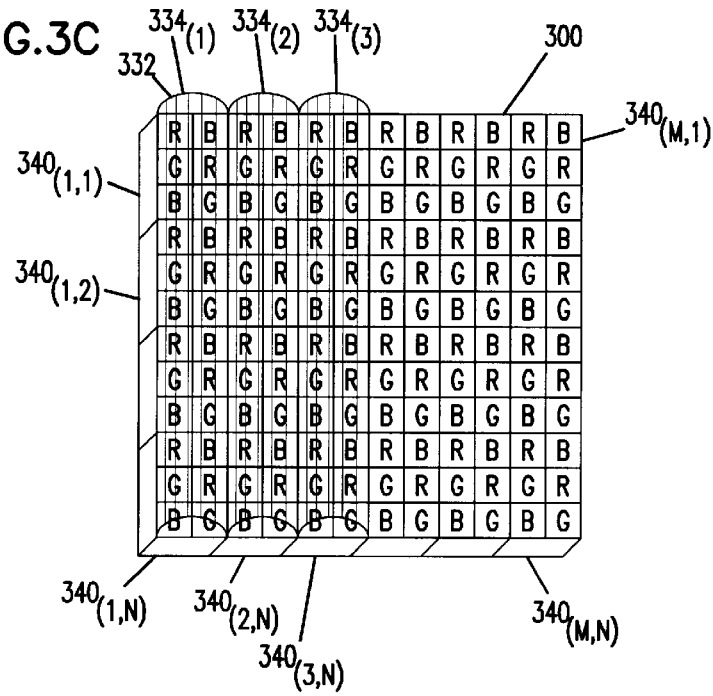
FIG. 3C is a schematic illustration of a sensor array and a lenticular lens layer, constructed and operative in accordance with another preferred embodiment of the present invention.

Reference is now made to FIG. 3C, which is a schematic illustration of a sensor array, generally referenced 330, and a lenticular lens layer, generally referenced 332, constructed and operative in accordance with another preferred embodiment of the present invention.

Sensor array is a matrix of MxN super-pixels, which are generally referenced 340. For example, the upper left super-pixel is denoted $340_{(1,1)}$, the last super-pixel in the same column is denoted $340_{(1,N)}$ and the lower-right pixel is denoted $340_{(M,N)}$. A lenticular lens layer 332 of which three lenticular elements are shown (references 334), is placed over the array 330.

Lenticular element $334_{(1)}$ covers the first column of super-pixels 340 from super-pixel $340_{(1,1)}$ to super-pixel $340_{(1,N)}$. Lenticular element $334_{(2)}$ covers the second column of super-pixels 340 from super-pixel $340_{(2,1)}$ to super-pixel $340_{(2,N)}$. Lenticular element $334_{(3)}$ covers the third column of super-pixels 340 from super-pixel $340_{(3,1)}$ to super-pixel $340_{(3,N)}$.

Accordingly, each of the lenticular elements of the lenticular lens layer covers an entire column of super-pixels.

it is noted that super-pixel according to the present invention can include sensors in any set of colors such as red-green-blue (RGB), cyan-yellow-magenta-green (CYMG), infra-red, ultra-violet and the like, in any arrangement or scheme such as columns, diagonals and the like. It is noted that such a set of colors can be achieved either by using specific color sensitive detectors or by using color filters over the wide spectrum detectors.

Figure 4:
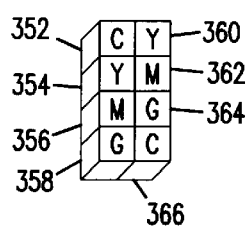
FIG. 4 is a schematic illustration of a super-pixel, constructed and operative in accordance with the another preferred embodiment of the present invention.

Reference is further made to FIG. 4, which is a schematic illusion of a super-pixel, generally referenced 350, constructed and operative in accordance with another preferred embodiment of the present invention. Super-pixel 350 includes a left section of sensors which includes four sensors 352, 354, 356 and 358 and a right section of sensors which also includes four sensors 360, 362, 364 and 366. Sensors 352 and 366 detect generally cyan colored light, sensors 354 and 360 detect generally yellow colored light, sensors 356 and 362 detect generally magenta colored light and sensors 358 and 364 detect generally green colored light. Hence, each of the sections includes a complete set of sensors for detecting light in entire visible spectrum.

Figure 5A:
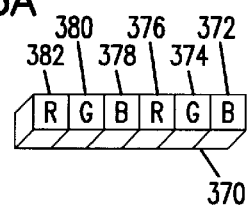
FIG. 5A is a schematic illustration of a color super-pixel, constructed and operative in accordance with a further preferred embodiment of the present invention.
Figure 5B:
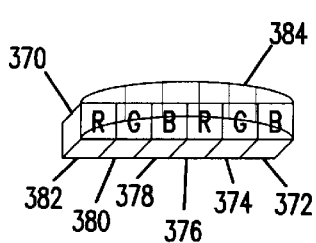
FIG. 5B is a schematic illustration of the color super-pixel of FIG. 5A, with a single lenticular element, constructed and operative in accordance with a further preferred embodiment of the present invention.
Figure 5C:
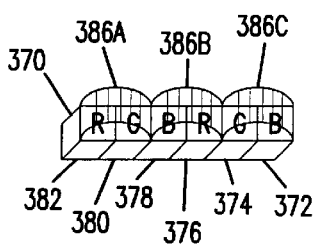
FIG. 5C is a schematic illustration of the color super-pixel of FIG. 5A, combined with three lenticular elements, constructed and operative in accordance with another preferred embodiment of the present invention.
Figure 6:
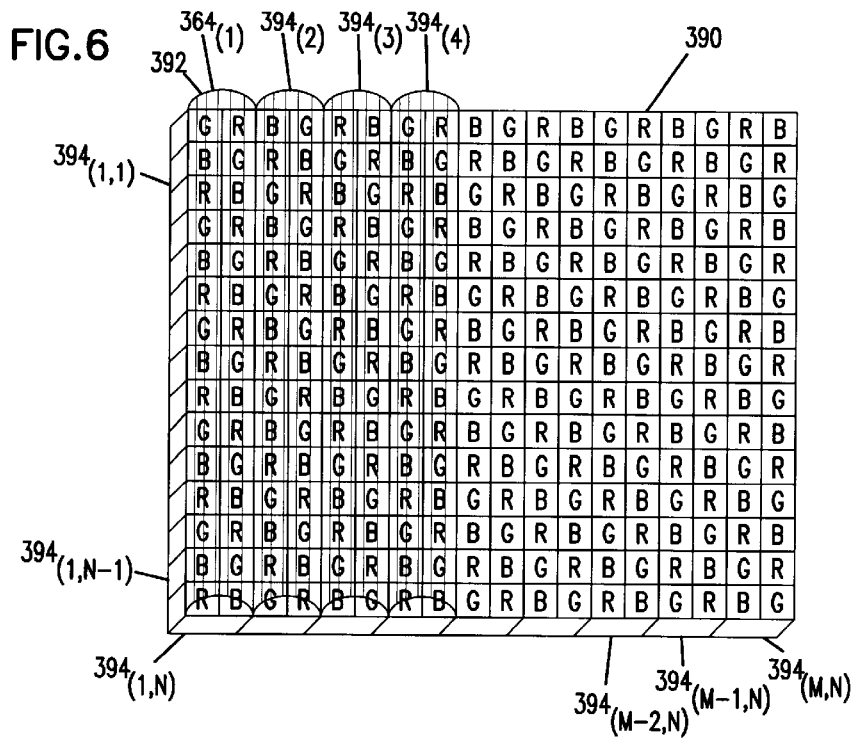
FIG. 6 is a schematic illustration of a sensor array and a lenticular lens layer, constructed and operative in accordance with another preferred embodiment of the present invention.

Reference is further made to FIGS. 5A, 5B and 5C. FIG. 6A is a schematic illustration of a super-pixel, generally referenced 370, constructed and operative in accordance with a further preferred embodiment of the present invention. FIG. 5B is a schematic illustration of super-pixel 370 combined with a single lenticular element, generally referenced 384, constructed and operative in accordance with a further preferred embodiment of the present invention. FIG. 5C is a schematic illustration of super-pixel 370 combined with three lenticular elements, generally referenced 386, constructed and operative in accordance with another preferred embodiment of the present invention.

The color arrangement which is provided for super-pixel 370 is typical for vertical light detection arrays, where each column of sensors is coated with light filtering layer of another color. As can be seen in FIG. 5A, super-pixel 370 includes a plurality of light sensors 372, 374, 376, 378, 380 and 382. Light sensors 372 and 378 are blue color range sensors. Light sensors 374 and 380 are green color range sensors.

Reference is now made to FIG, 6, which is a schematic illustration of a sensor, generally referenced 390, and a lenticular lens layer, generally referenced 392, constructed and operative in accordance with another preferred embodiment of the present invention. Sensor 390 is logically divided into a plurality of super-pixels, generally referenced $394_{(x,y)}$. For example, the upper-left super-pixel is referenced $394_{(1,1)}$ and the lower-right side super-pixel is referenced $394_{(M,N)}$.

As can be seen from figure six, the color arrangement of sensor 390 is diagonal. Hence, each super pixel has a different color arrangement, end generally speaking, there are several types of super-pixels, such as red-blue (super pixel $394_{(M-2,N)}$), green-red (super pixel $394_{(M-1,N)}$ and blue-green (super pixel $394_{(M,N)}$.

Figure 7A:
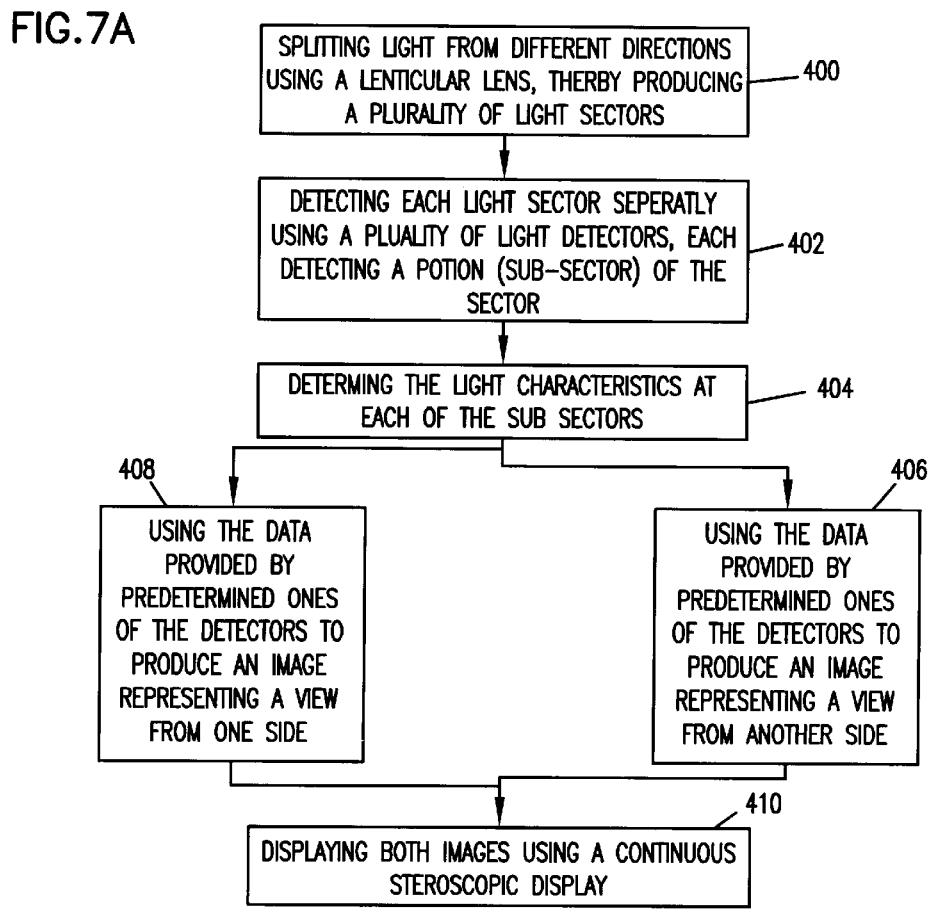
FIG. 7A is a schematic illustration of method for operating the apparatus of FIG. 2, operative in accordance with a further preferred embodiment of the pent invention.

Reference is now made to FIG. 7A, which is a schematic illustration of method for operating apparatus 200, operative in accordance with a further preferred embodiment of the present invention.

In step 400, the apparatus 200 splits light which arrives from different directions, utilizing the lenticular lens 104. Each of the lenticular elements produces two light sectors, one sector which includes light rays arriving from the left side and another sector which includes light rays arriving from the right side.

In step 402, the apparatus detects each light sector separately, using a plurality of light detectors, each detecting a portion of its respective sector. With reference to FIG. 3B, sensors 302, 304 and 306 detect light which arrives from the lenticular element 318, at the left side sector and sensors 308, 310 and 312 detect light which arrives, from the lenticular element 318, at the right side sector. Each of the sensors detects light at a sub-sector.

In step 404, the apparatus 200 determines the light characteristics as detected by each of the light sensors, at each of the sub-sectors.

In step 408, the apparatus 200 utilizes the data, which was accumulated from selected sub-sectors to determine and produce an image representing a view from one side. In step 406, the apparatus 200 utilizes the data, which was accumulated from other selected sub-sectors to determine and produce an image representing a view from another side.

In step 410, the apparatus 200 displays both images using a continuous stereoscopic display device.

According to a further aspect of the invention, information from selected pixels can be used to enhance information for other pixels. For example, color information of pixels, which are associated with a first color is used for extrapolating that color at the location of another pixel, associated with a second color.

Figure 7B:
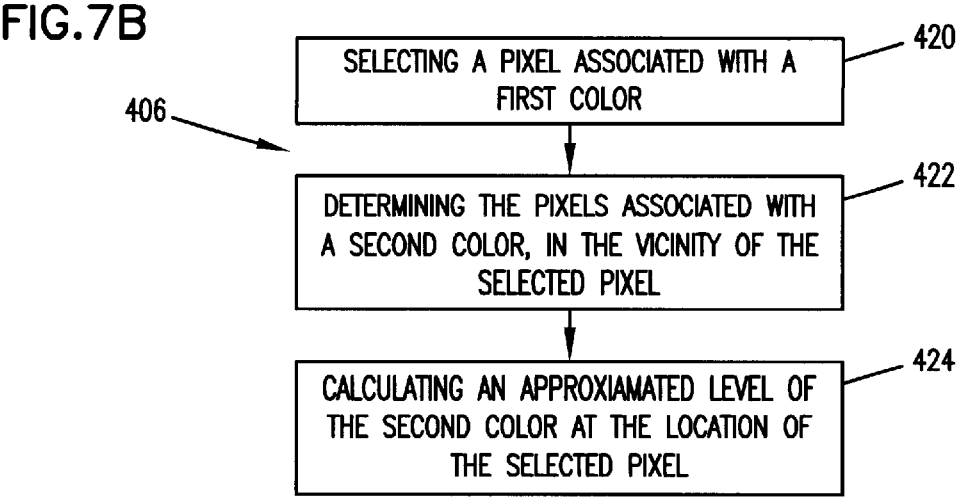
FIG. 7B is an illustration in detail of a step of the method of FIG. 7A.
Figure 7C:
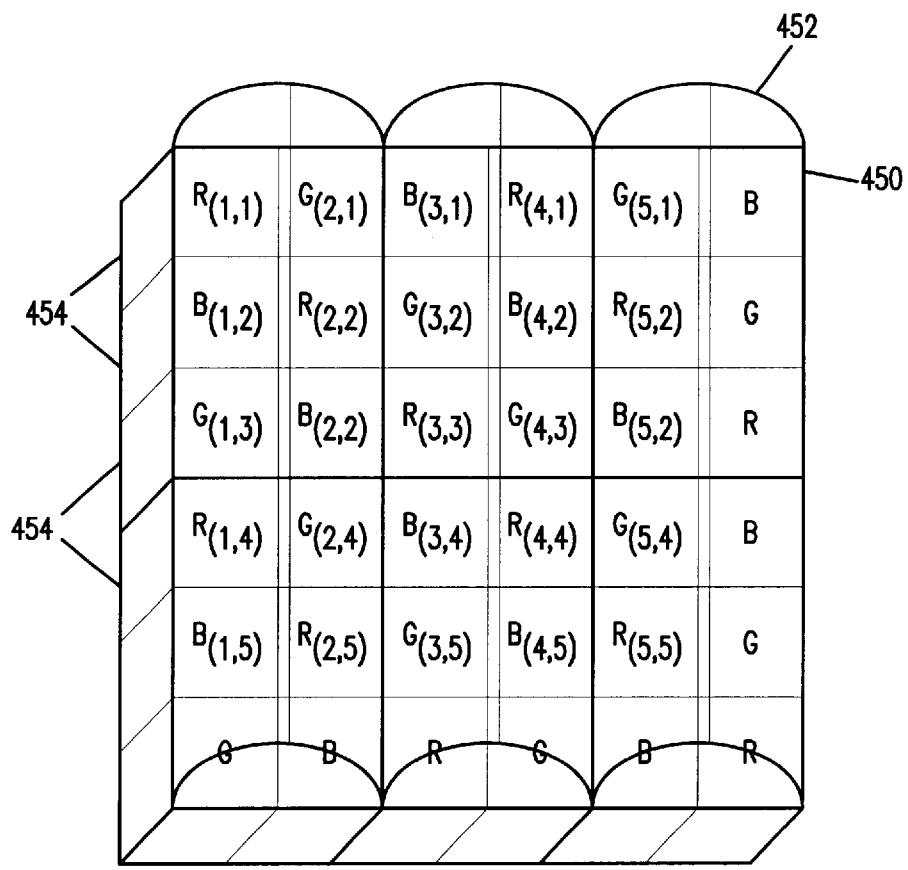
FIG. 7C is a schematic illustration of a sensor array and a lenticular lens layer constructed and operative in accordance with another preferred embodiment of the present invention.

Reference is further made to FIGS. 7B and 7C. FIG. 7B is an illustration in detail of step 406 of FIG. 7A. FIG. 7C is a schematic illustration of a sensor array, generally referenced 450, and a lenticular lens layer, generally referenced 452, constructed and operative in accordance with another preferred embodiment of the present invention. Sensor array 450 includes a plurality of pixel sensors, referenced 454, each associated with a selected color. For example, pixel sensors $R_{(1,1)}$, $R_{(2,2)}$, $R_{(3,3)}$, $R_{(4,4)}$, $R_{(1,4)}$ and $R_{(4,1)}$ are associated with the red color. Pixel sensors $G_{(2,1)}$, $G_{(3,2)}$, $G_{(4,3)}$, $G_{(1,3)}$ and $G_{(2,4)}$ are associated with the green color. Pixel sensors $B_{1,2)}$, $B_{(2,3)}$, $B_{(3,4)}$, $B_{(3,1)}$ and $B_{(4,2)}$ are associated with the blue color.

In step 420, the system, according to the invention, selects a pixel sensor, associated with a first color. With reference to FIG. 7C, the selected pixel sensor according to the present example is pixel sensor $R_{(3,3)}$.

In step 422, the system determines pixels, associated with a second color, in the vicinity of the selected pixel. It is noted that these pixels can also be restricted to ones, which relate to the same image side of the selected pixel. With reference to FIG. 7C, the second color is green and the green pixel sensors, in the vicinity of pixel sensor $R_{(3,3)}$, respective of the same image side are pixel sensors $G_{(5,1)}$, $G_{(3,2)}$, $G_{(3,5)}$, $G_{(5,4)}$, and $G_{(1,3)}$.

In step 424, the system calculates an approximation of the level of the green color at the location of the selected pixel $R_{(3,3)}$. It is noted that the calculation can include a plurality of approximation procedures, such as calculating the weighted average level, depending on the location of pixel sensors $G_{(5,1)}$, $G_{(3,2)}$, $G_{(3,5)}$, $G_{(5,4)}$, and $G_{(1,3)}$, with respect to the location of the selected pixel sensor $R_{(3,3)}$. Similarly, blue color level at the location of the selected pixel sensor $R_{(3,3)}$, can be calculated using the information received from pixel sensors $B_{(1,2)}$, $B_{(1,5)}$, $B_{(3,1)}$, $B_{(3,4)}$ and $B_{(5,3)}$. Hence the present invention provides a method for enhancing picture resolution by means of color information interpolation, using image processing.

It is noted that any of the lenticular elements is not necessarily round shaped but can be formed according to other optical structures which base on various prism designs and the like, which provide the directing of beams of light coming from different directions in different directions.

Figure 8:
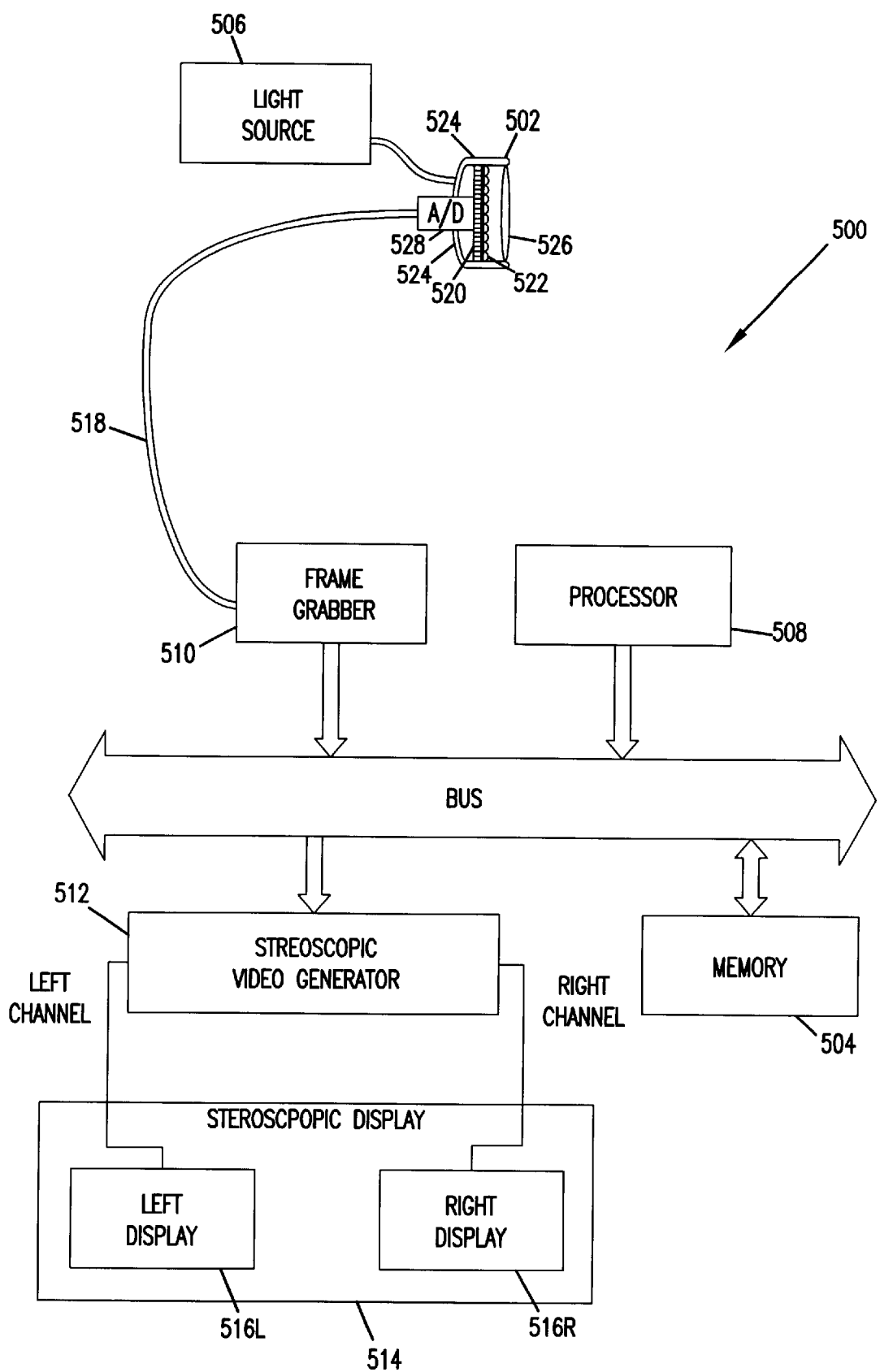
FIG. 8 is a schematic illustration of a stereoscopic vision apparatus, constructed and operative in accordance with another preferred embodiment of the present invention.

Reference is now made to FIG. 8, which is a schematic illustration of a stereoscopic vision apparatus, generally referenced 500 constructed and operative in accordance with another preferred embodiment of the present invention.

Apparatus 500 includes a sensor assembly 502, a frame grabber 510, a processor 508, a light source 506, a memory unit 504, a stereoscopic video generator 512 and a stereoscopic display 514. The sensor assembly 502 is connected to the frame grabber 510 using a flexible cord 518. The frame grabber 510, the processor 508, the memory unit 504 and the stereoscopic video generator 512 are all interconnected using a common bus.

The sensor assembly 502 is generally similar to the sensor assembly 202, described herein above in conjunction with FIG. 2. The sensor assembly 502 includes a lens 526, a lenticular lens layer 522, a light sensor array 520 an analog to digital converter (A/D) 528 and light projecting means 524. The lenticular lens layer 522 is attached to the light sensor array 520. Light sensor array 520 is connected to the A/D 528, which could also act as a supporting base. The light projecting means 524 is connected to light source 506, which provides light thereto.

The stereoscopic display 514 includes two display units, a left display unit 516L (for placing in front of the left eye of the user) and right display unit 516R (for placing in front of the right eye of the user). Hence, the stereoscopic display 514 is capable of displaying stereoscopic images continuously.

The sensor assembly 502 operates in a manner, similar to that of sensor assembly 202, described hereinabove in conjunction with FIG. 2. An electronic representation of this information, is provided by the A/D converter 528, after being converted into digital format.

The information data is received by the frame grabber 510 and hence made available to the processor 508 via the bus. As the processor 508 processes the information it uses the memory unit 504 as temporary storage. After processing the information, the processor 508 produces two matrixes each being a reconstructed representation relating to one of the originally detected images. The processor provides these matrixes to the stereoscopic video generator 512, which in turn produces two respective video signals, one for the left view image an another for the right view image.

The stereoscopic video generator 512 provides the video signals to the stereoscopic display 514, which in turn produces two images, one using right display unit 516R and another using left display unit 516L.

Figure 9A:
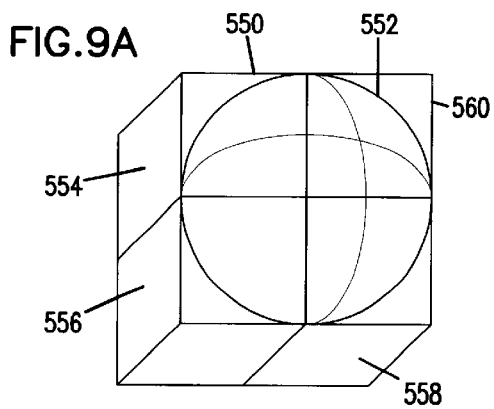
FIG. 9A is a view in perspective of a section of light sensors, and a lenticular element, constructed and operative in accordance with a further preferred embodiment of the present invention.
Figure 9B:
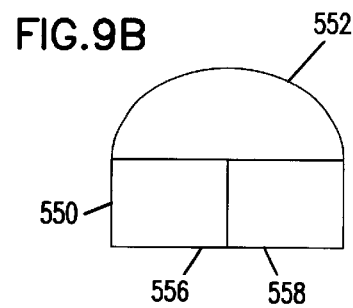
FIG. 9B is a view from the bottom of the lenticular element and the section of light sensors of FIG. 9A.
Figure 9C:
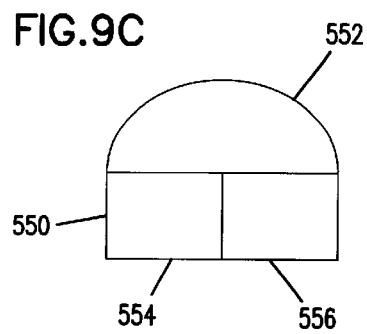
FIG. 9C is a view from the side of the lenticular element and the section of light sensors of FIG. 9A.

Reference is now made to FIGS. 9A, 9B and 9C. FIG. 9A is a view in perspective of a super-pixel, generally referenced 550, and a lenticular element, generally referenced 552, constructed and operative in accordance with a further preferred embodiment of the present invention. FIG. 9B is a view from the bottom of the lenticular element and the super-pixel of FIG. 9A. FIG. 9C is a view from the side of the lenticular element and the super-pixel of FIG. 9A.

This super-pixel 550 includes four sensor sections, 554, 556, 558 and 560, arranged in a rectangular formation. The lenticular Element 552 is shaped like a dome and is basically a divided into four sections, each facing a different one of the sensor sections 554, 556, 558 and 560.

The super-pixel 550 and the lenticular element 552 form, together, an optical detection unit, which is capable of detecting and distinguishing light which arrives from four different directions. The lenticular element 552 directs a portion of the upper-left side view of the detected object to sensor section 554 and directs a portion of the lower-left side view of the detected object to sensor section 556. In addition, the lenticular element 552 directs a portion of the upper-right side view of the detected object to sensor section 560 and a portion of the lower-right side view of the detected object to sensor section 558.

It is noted that according to a further aspect of the invention, the four-direction arrangement, which is described in FIGS. 9A, 9B and 9C can be used to logically rotate the image which is provided to the user, without physically rotating the device itself. At first, sensor sections 560 and 558 are used to form the right-side image and sensor sections 554 and 556 are used to form the left-side image. A rotation at an angle of 90° clockwise, is provided by assigning sensor sections 554 and 560, to form the right side image, and assigning sensor sections 556 and 558, to form the left-side image. It is further noted that a rotation in any desired angle can also be performed by means of a linear or other combination of sensor sections, when reconstructing the final images.

Figure 10:
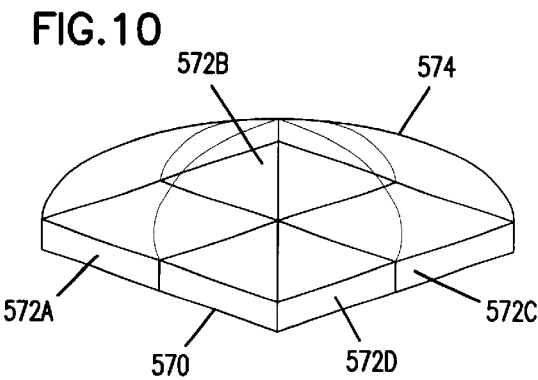
FIG. 10 is a view in perspective of a section of light sensors, and a lenticular element, constructed and operative in accordance with a further preferred embodiment of the present invention.

Reference is now made to FIG. 10, which is a view in perspective of a section of light sensors, generally referenced 570, and a lenticular element, generally referenced 572, constructed and operative in accordance with a further preferred embodiment of the present invention.

Lenticular element 572 is extended to cover the entire area of the section of pixels, so as to enhance light transmission thereto.

Figure 11:
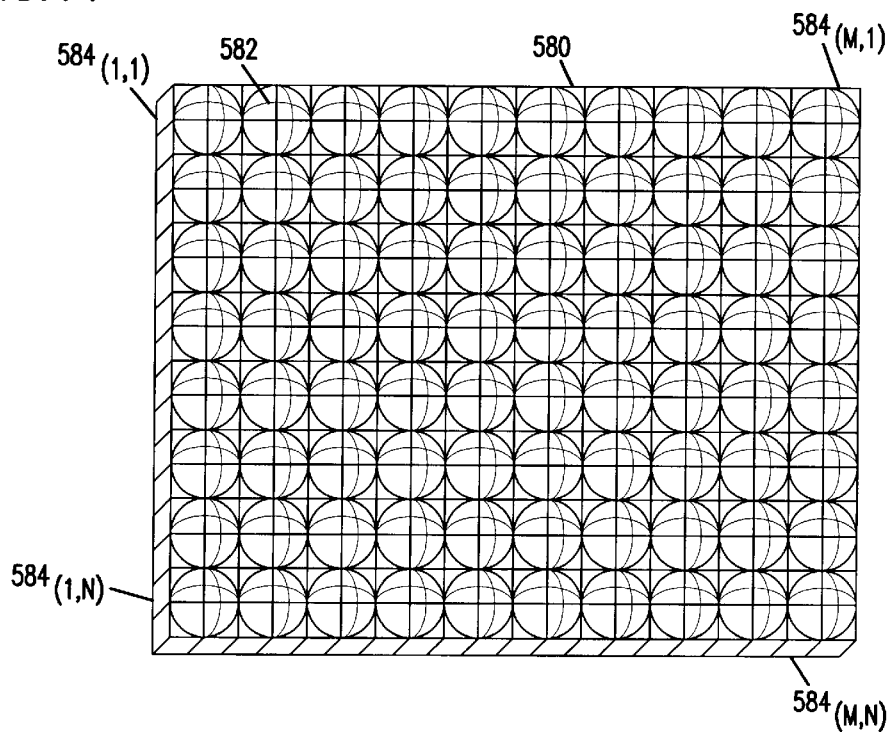
FIG. 11 is a view in perspective of a sensor array and a lenticular layer, constructed and operative in accordance with a further preferred embodiment of the present invention.

Reference is now made to FIG. 11, which is a view in perspective of a sensor array, generally referenced 580, and a lenticular layer, generally referenced 582, constructed and operative in accordance with a further preferred embodiment of the present invention.

The lenticular layer 580 includes a plurality of four direction lenticular elements such as described in FIGS. 9A and 10. The sensor array 580 is logically divided into a plurality of sensor sections, generally referenced $584_{(x,y)}$. For example, the upper left sensor section is referenced $584_{(1,1)}$ and the lower-right sensor section is referenced $584_{(M,N)}$. Each of the sensor sections is located, beneath a lenticular element and detects light directed thereby.

Figure 12A:
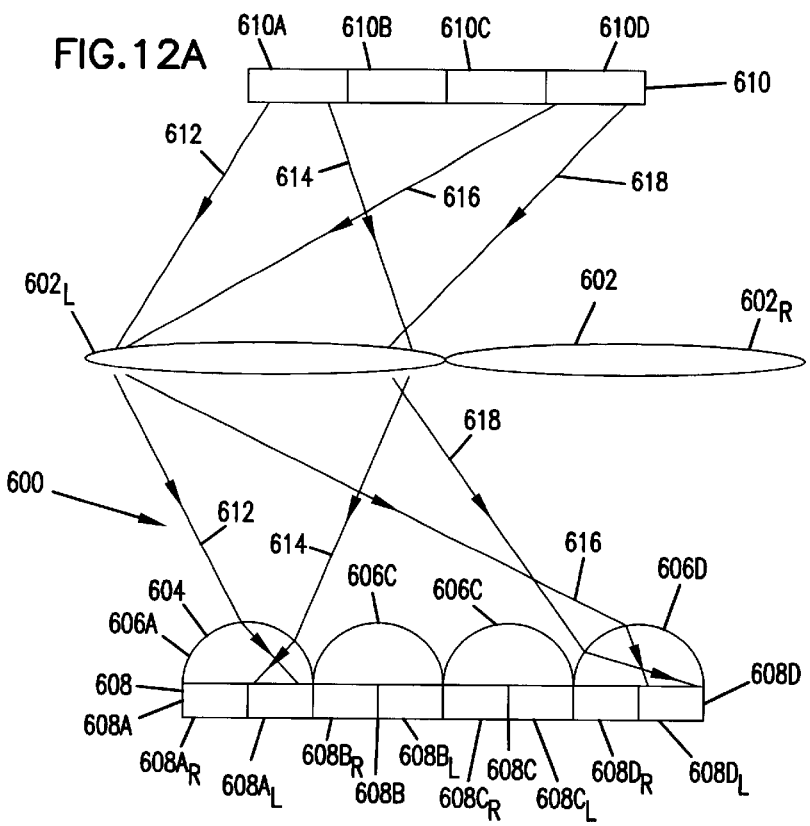
FIG. 12A is a schematic illustration of a detection apparatus, construed and operative in accordance with another prod embodiment of the present invention.
Figure 12B:
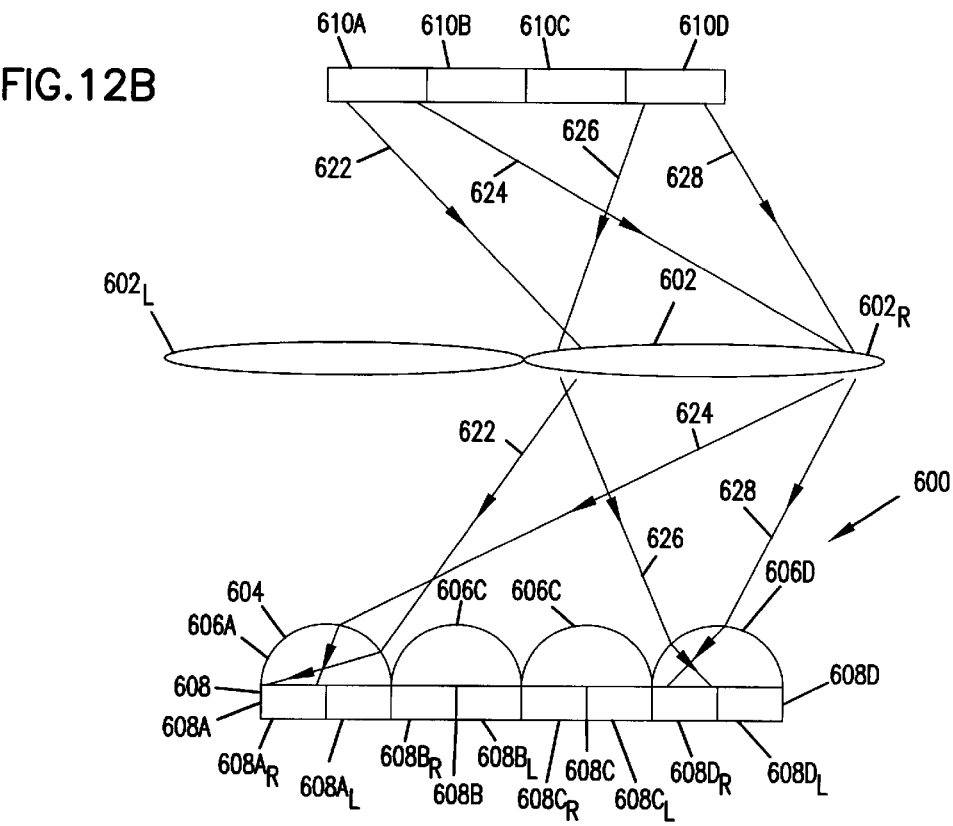
FIG. 12B is another schematic illustration of the detection apparatus of FIG. 12A.

Reference is now made to FIGS. 12A and 12B. FIG. 12A is a schematic illustration of a detection apparatus, generally referenced 600, constructed and operative in accordance with another preferred embodiment of the present invention. FIG. 12B is another schematic illustration of detection apparatus 600, of FIG. 12A.

Detection apparatus 600 includes an optical assembly 602, a lenticular layer 604 and an array of sensors 608. The detection apparatus 600 detects images of an object 610, which includes a plurality of object sections 610A, 610B 610C and 610D.

Sensor array 608 includes a plurality of super-pixels 608A, 608B, 608C and 608D. Each of these super-pixels is divided into a left-side section and a right-side section. For example, super-pixel 608A includes a left-side section, designated $608A_L$ and a right-side section, designated $608A_R$.

The optical assembly 602 is divided into two optical sections $602_L$ and $602_R$, each directed at transferring an image, which represents a different side view. Optical section $602_R$ transfers an image, which is a view from the right side of object 610. Optical section $602_L$ transfers an image, which is a view from the left side of object 610.

A plurality of light rays 612, 614, 616 and 618 are directed from all sections of the object 610 to the left side of optical assembly 602 (i.e., Optical section $602_L$) and are directed to the lenticular layer 604. Here, these rays are further directed to the left-side view associated sensor sections, which are sensor sections $608_L$ (i.e., sensor sections $608A_L$, $608B_L$, $608C_L$ and $608D_L$).

With reference to FIG. 12B, a plurality of light rays 622, 624, 626 and 628 are directed from all sections of the object 610 to the right side of optical assembly 602 (i.e., Optical section $602_R$) and are directed to the lenticular layer 604. Here, these rays are further directed to the right-side view associated sensor sections, which are sensor sections $608A_R$, $608B_R$, $608C_R$ and $608D_R$.

Reference is now made to FIG. 13, which is a schematic illustration of a detection apparatus, generally referenced 630, constructed and operative in accordance with a further preferred embodiment of the present invention. Detection apparatus 630 includes an optical assembly, which is divided into four sections 632, 634, 636 and 638, a lenticular layer 642 and an array of sensors 640. The detection apparatus 630 detects images of an object 648, which includes a plurality of object sections 648A, 648B, 648C, 648D, 648E and 648F. Light rays, which arrive from object 648 to any of the optical sections, are directed to a lenticular element of the lenticular layer 642, according to their origin.

In the present example, all of the light rays 646A, 646B, 646C and 646D arrive from object element 648A. Each of these rays is received at a different optical section. Ray 646A is received and directed by optical section 636, ray 646B is received and directed by optical section 638, ray 646C is received and directed by optical section 634 and ray 646D is received and directed by optical section 632. Each of the optical sections directs its respective ray to a specific lenticular element $642_{(1,1)}$, at the right side of the lenticular layer 642. The location of lenticular element $642_{(1,1)}$ is respective of the location of the object element 648. The lenticular element $642_{(1,1)}$ directs each of the rays to predetermined light sensors within its respective super-pixel $640_{(1,1)}$.

In accordance with a further aspect of the present invention, there is provided a reduced size color stereovision detection system, which uses time, multiplexed colored light projections and respective time-multiplexed frame grabbing.

Reference is now made to FIGS. 14A and 14B. FIG. 14A is a partially schematic partially perspective illustration of a combined illumination and detection device, generally referenced 650, constructed and operative in accordance with another preferred embodiment of the present invention. FIG. 14B is a partially schematic partially perspective illustration of the combined illumination and detection device 650 of FIG. 14A, a controller, generally designated 662 and output frames, constructed and operative in accordance with a further preferred embodiment of the present invention.

Device 650 includes a lenticular layer 652, a full spectrum sensor array 654, an optical assembly 660 and an illuminating unit 656, surrounding the optical assembly 660. Illuminating unit 656 includes a plurality of illuminating elements, generally referenced 658, each being of a specific predetermined color. Illuminating elements $658_{RED}$ produce generally red light, illuminating elements $658_{GREEN}$ produce generally green light and illuminating elements $658_{BLUE}$ produce generally blue light. It is noted that each of the illuminating elements can be of a specific color (i.e., a specific wavelength), a range of colors (i.e., a range of wavelengths) or alternating colors. For example, a multicolor LED.

Each group of illuminating elements, which are of the same color, is activated at a different point in time. For example, illuminating elements $658_{RED}$ are activated and shut down first, illuminating elements $658_{GREEN}$ are activated and shut down second and illuminating elements $658_{BLUE}$ are activated and shut down last. Then the illuminating sequence is repeated.

With reference to FIG. 14B, the controller 662 is connected to the sensor array 654 and the illuminating unit 656. The sensor array 654 is includes full spectrum sensors, which are capable of detecting red, green and blue light, but cannot indicate the wavelength of the detected light. The controller 662 associated the images, which are detected at any particular moment, using the sensor array 654, with the color of the illuminating elements, which were active at that particular moment.

Hence, the first detected frame 664 in an illumination sequence is considered red, since the illuminating elements, which were active at that time, were illuminating elements $658_{RED}$. Similarly, the second detected frame 666 in an illumination sequence is considered green, since the illuminating elements, which were active at that time, were illuminating elements $658_{GREEN}$. Finally, the last detected frame 668 in an illumination sequence is considered blue, since the illuminating elements, which were active at that time, were illuminating elements $658_{BLUE}$. It is noted that any other combination of colors is applicable for this and any other aspect of the present invention, such as CYMG and the like.

Reference is now made to FIG. 15, which is an illustration in perspective of a color illumination unit, generally referenced 670, constructed and operative in accordance with a further preferred embodiment of the present invention.

Unit 670 includes a light-guiding element 671, which is generally shaped as an open-cut hollow cone, having a narrow section 674 and a wide section 672. A detection head according to the invention, such as described in FIG. 2 (referenced 202), can be placed within the hollow space of the light-guiding element 671. A multi-color light source 680 can be connected to the narrow section 674. Light, such as light ray 678, which is emitted from the light source 680, is directed via the light guiding element 671 and is projected through the wide section 672.

According to a further aspect of the invention, a remote multi-color light source 682 can be connected to the narrow section 674 via additional light guiding members such as optic-fibers 684. Light, such as light ray 676, which is emitted from the light source 682, is directed via the light guiding members 684 to the narrow section 674. The light-guiding element 671 guides ray 676, and projects it through the wide section 672. This arrangement is useful when using an external light source, which is to be placed outside the inspected area (for example, outside the body of the patient).

According to a further aspect of the invention, a full spectrum illumination unit, which produces white light, is combined with a device such as sensor assembly 202.

Figure 16:
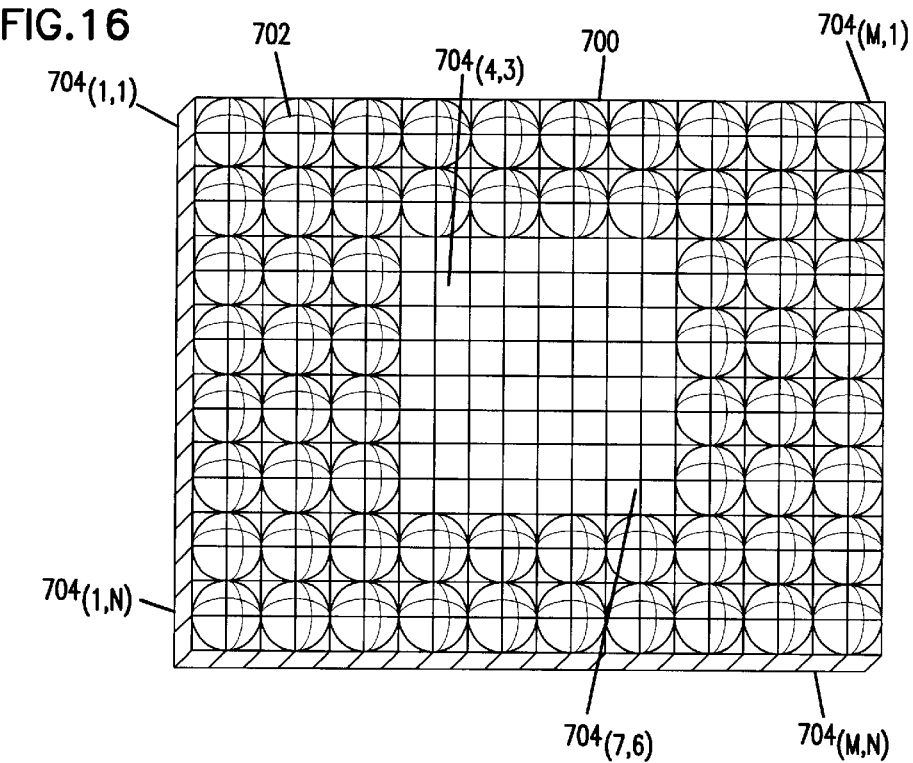
FIG. 16 is a view in perspective of a sensor array and a partial lenticular layer, constrcted and operative in accordance with another preferred embodiment of the present invention.

Reference is now made to FIG. 16, which is a view in perspective of a sensor array, generally referenced 700, and a partial lenticular layer, generally referenced 702, constructed and operative in accordance with a further preferred embodiment of the present invention.

The partial lenticular layer 700 includes a plurality of four direction lenticular elements such as described in FIGS. 9A and 10. The sensor array 700 is logically divided into a plurality of sensor sections, generally referenced $704_{(x,y)}$. For example, the upper left sensor section is referenced $704_{(1,1)}$ and the lower-right sensor section is referenced $704_{(M,N)}$. Some of the sensor sections, in the perimeter, are located beneath lenticular elements and others, such as the sensor sections in the center rectangle, which is defined by sensor sections $704_{(4,3)}$–$704_{(7,6)}$ are not. Accordingly, the sensors which are located at the center rectangle can not be used to provide multi-direction (stereoscopic or quadroscopic) information. Instead, these sensors provide enhanced resolution monoscopic information.

Figure 17:
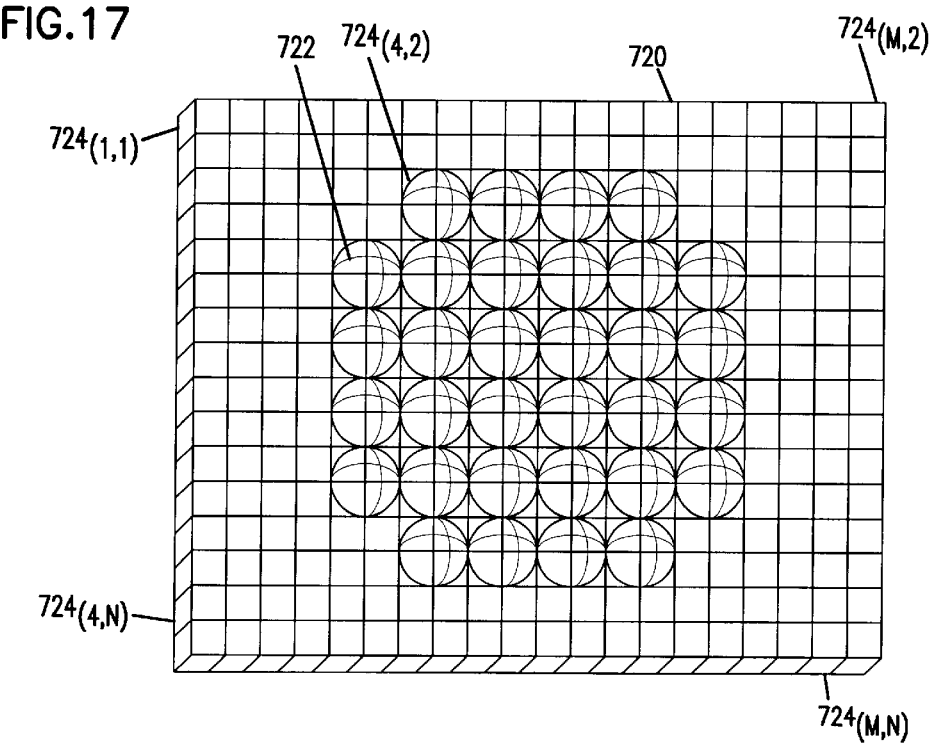
FIG. 17 is a view in perspective of a sensor array and a partial lenticular layer, constructed and operative in accordance with a further preferred embodiment of the present invention.

Reference is now made to FIG. 17, which is a view in perspective of a sensor array, generally referenced 720, and a partial lenticular layer, generally referenced 722, constructed and operative in accordance with a further preferred embodiment of the present invention.

The partial lenticular layer 720 includes a plurality of four direction lenticular elements such as described in FIGS. 9A and 10. The sensor array 720 is logically divided into a plurality of sensor sections, generally referenced $724_{(x,y)}$. For example, the upper left sensor section is referenced $724_{(1,1)}$ and the lower-right sensor section is referenced $724_{(M,N)}$. Here, some of the sensor sections, in the center, (such as sensor section $724_{(4,2)}$ are located beneath lenticular elements and others, such as the sensor sections in the perimeter (such as sensor section $724_{(1,1)}$, are not. Accordingly, the sensors which are located at the center provide multi-direction (stereoscopic or quadroscopic) information and the ones in the perimeter provide enhanced resolution monoscopic information.

Figure 18:
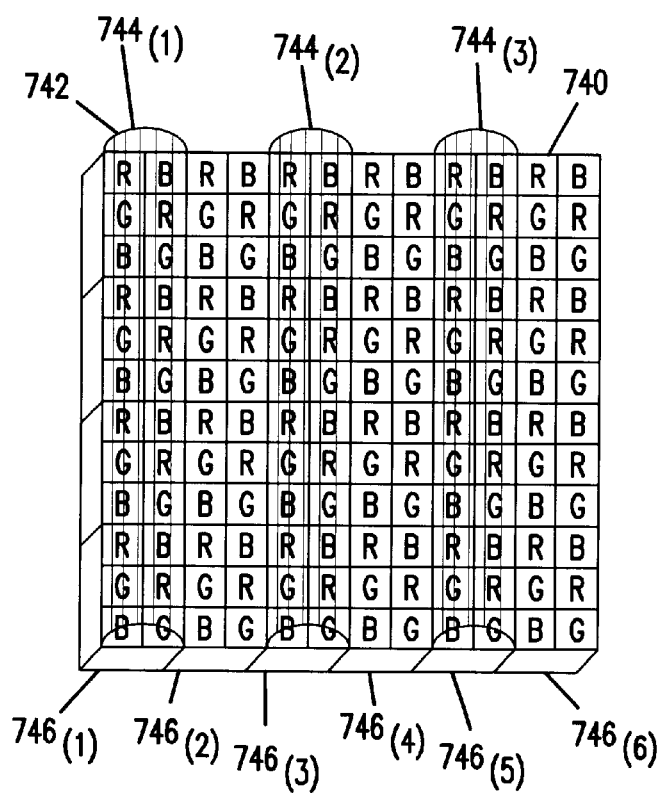
FIG. 18 is a schematic illustration of a sensor array and a partial lenticular layer, constructed and operative in accordance with another preferred embodiment of the present invention.

In accordance with a further aspect of the present invention there is provided a partial lenticular, which includes spaced apart lenticular elements. Reference is now made to FIG. 18, which is a schematic illustration of a sensor array, generally referenced 740, and a partial lenticular layer, generally referenced 742, constructed and operative in accordance with another preferred embodiment of the present invention.

The partial lenticular layer 742 includes a plurality of lenticular elements designated $744_{(1)}$, $744_{(2)}$ and $744_{(3)}$. Lenticular element $744_{(1)}$ is located over the first two left columns of color sensors, generally designated $746_{(1)}$, of sensor array 740. Hence, the information received from these first two left columns of color sensors of sensor array 740 contains stereoscopic information. The third and fourth columns of color sensors, generally designated $746_{(2)}$, of sensor array 740 do not have a lenticular element located thereon and hence cannot be used to provide stereoscopic information.

Similarly, lenticular elements $744_{(2)}$ and $744_{(3)}$ are located over color sensors column pairs, $746_{(3)}$ and $746_{(5)}$, respectively, while color sensors column pairs, $746_{(4)}$ and $746_{(6)}$ are not covered with lenticular elements.

Figure 19:
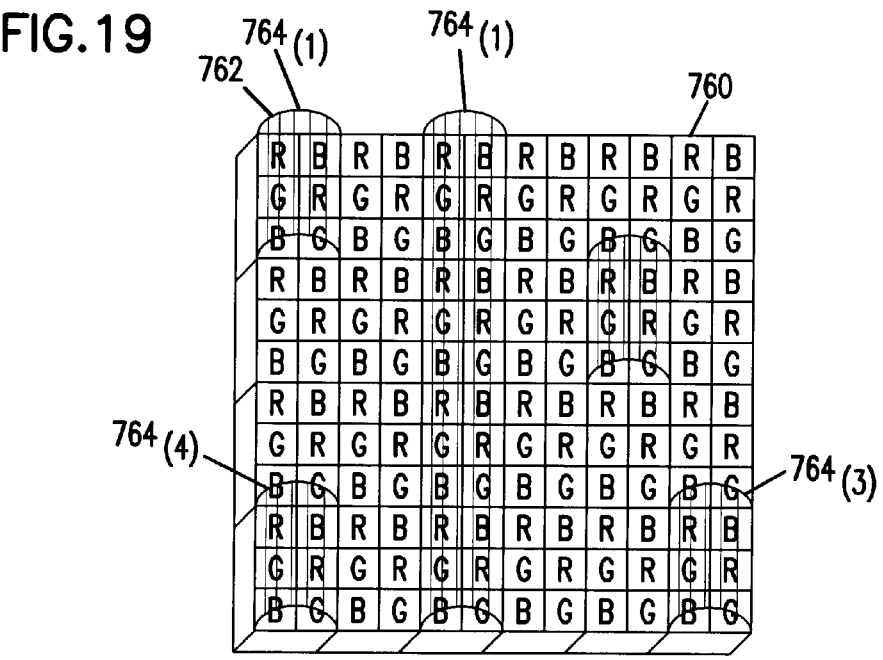
FIG. 19 is a schematic illustration of a sensor array and a partial lenticular layer, constructed and operative in accordance with a further preferred embodiment of the present invention.

Reference is now made to FIG. 19, which is a schematic illustration of a sensor array, generally referenced 760, and a partial lenticular layer, generally referenced 762, constructed and operative in accordance with a further preferred embodiment of the present invention.

Lenticular layer 762 includes a plurality of lenticular elements, referenced $764_{(1)}$, $764_{(2)}$, $764_{(3)}$ and $764_{(4)}$, being of different sizes and located at random location over the sensor array 740. It is noted that any structure of partial lenticular layer is applicable for the invention, whereas the associated image processing application has to be configured according to the coverage of that specific lenticular layer and address covered sensors and uncovered sensors appropriately.

It will be appreciated by persons skilled in the art that the present invention is not limited to what has been particularly shown and described here in above. Rather the scope of the present invention is defined only by the claims which follow.

What is claimed is:

1. Stereoscopic device comprising:

lenticular lens layer, including a plurality of lenticular elements; and light sensor array, including a plurality of light sensors, wherein selected ones of said light sensors detect light at a predetermined range of wavelengths and wherein at least another predetermined range of wavelengths;

a light illuminating unit, wherein said light illuminating unit surrounds said lenticular lens layer; and wherein each said lenticular elements is located in front of a selected group of said light sensors, thereby directing light from different directions to different light sensors within said selected group of said light sensors.

2. The stereoscopic device according to either of claim 1, wherein each said lenticular element includes light directing means which distinguish between at least two directions of light.

3. The stereoscopic device according to either of claims 1 and 2, wherein each said lenticular element includes light directing means, which distinguish between four directions of light.

4. The stereoscopic device according to either of claims 1 and 2, wherein each said lenticular element is shaped in a general semi-cylindrical shape.

5. The stereoscopic device according to either of claims 1 and 2, wherein each said lenticular element is shaped in a general semi-sphere shape.

6. The stereoscopic device according to either of claims 1 and 2, wherein each said selected group of said light sensors includes an even number of light sensors.

7. The stereoscopic device according to claim 1, wherein said light illuminating unit comprises:
   a light source;
   a light dispersing unit; and
   light guiding means connected between said light source and said light dispersing unit, thereby guiding light from said light source to said light dispersing unit.

8. The stereoscopic device according to claim 1, wherein said light illuminating unit produces light in a predetermined range of wavelengths.

9. The stereoscopic device according to either of claims 1 and 2, further comprising a controller connected to said array of light sensors, wherein said controller produces an image for each said different directions, by combining data received from said light sensors respective of each said different directions.

10. The stereoscopic device according to claim 9, further comprising a stereoscopic display unit, connected to said controller, for producing said image.

11. The stereoscopic device according to claim 9, wherein said image is stereoscopic.

12. The stereoscopic device according to claim 9, wherein said image is partially stereoscopic.

13. The stereoscopic device according to either of claims 1 and 2, further comprising capture means, connected to said array of light sensors, for capturing data received from said light sensors.

14. The stereoscopic device according to claim 13, further comprising a storage unit for storing said captured data.

15. The stereoscopic device according to either of claims 1 and 2, wherein each said predetermined ranges of wavelengths is selected from the list consisting of:
   substantially visible red color light;
   substantially visible green color light;
   substantially visible blue color light;
   substantially visible cyan color light;
   substantially visible yellow color light;
   substantially visible magenta color light;
   substantially infra-red light;
   substantially ultra-violet light; and
   Visible light.

16. The stereoscopic device according to claim 1, wherein said light sensor array is a color red-green-blue (RGB) sensor array.

17. The stereoscopic device according to claim 1, wherein said light sensor array is a color cyan-yellow-magenta-green (CYMG) sensor array.

18. Stereoscopic device comprising:
   lenticular lens layer, including a plurality of lenticular elements; and
   light sensor array, including a plurality of light sensors, said light sensors detecting light at a predetermined range of wavelengths;
   a light illuminating unit, wherein said light illuminating unit surrounds said lenticular lens layer;
   wherein each said lenticular elements is located in front of a selected group of said light sensors, thereby directing light from different directions to different light sensors within said selected group of said light sensors.

19. The stereoscopic device according to claim 18, wherein said light illuminating unit surrounds said lenticular lens layer.

20. Stereoscopic device comprising:
   lenticular lens layer, including a plurality of lenticular elements; and
   light sensor array, including a plurality of light sensors, wherein selected ones of said light sensors detect light at a predetermined range of wavelengths and wherein at least another predetermined range of wavelengths;
   wherein each said lenticular elements is located in front of a selected group of said light sensors, thereby directing light from different directions to different light sensors within said selected group of said light sensors; and
   a light illuminating unit, wherein said light illuminating unit comprises:
      a light source;
      a light dispersing unit; and
      light guiding means connected between said light source and said light dispersing unit, thereby guiding light from said light source to said light dispersing unit;
   wherein said light dispersing unit surrounds said lenticular lens layer.

21. Stereoscopic device comprising:
   lenticular lens layer, including a plurality of lenticular elements;
   light sensor array, including a plurality of light sensors, wherein selected ones of said light sensors detect light at a predetermined range of wavelengths and wherein at least another predetermined range of wavelengths;
   a light illuminating unit, wherein said light illuminating unit produces at least two alternating beams of light, each said beams of light characterized as being in a different range of wavelengths; and
   wherein each said lenticular elements is located in front of a selected group of said light sensors, thereby directing light from different directions to different light sensors within said selected group of said light sensors.

22. The stereoscopic device according to claim 21, wherein each said predetermined ranges of wavelengths is selected from the list consisting of:
   substantially visible red color light;
   substantially visible green color light;
   substantially visible blue color light;
   substantially visible cyan color light;
   substantially visible yellow color light;
   substantially visible magenta color light;
   substantially infra-red light;
   substantially ultra-violet light; and
   Visible light.

23. The stereoscopic device according to claim 21, further comprising a controller connected to said array of light sensors, wherein said controller produces an image for each combination of a selected one of said different directions and a selected one of said beams of light, by combining data received from said light sensors respective of each said different directions, with respect to the currently illuminating one of said beams of light.

24. The stereoscopic device according to claim 23, further comprising a stereoscopic display unit, connected to said controller, for producing said image.

25. The stereoscopic device according to claim 23, wherein said image is stereoscopic.

26. The stereoscopic device according to claim 23, wherein said image is partially stereoscopic.

27. Method for detecting a stereoscopic image comprising the steps of:

splitting light which arrives from different directions, using a lenticular lens layer, thereby producing at least two images, which are intertwined in a master image; and detecting said master image using a multiple wavelength detector;

sequentially illuminating a detected area with alternating beams of light, of different ranges of wavelength; and associating said master image in time, with the currently illuminating ranges of wavelength.

28. The Method according to claim 27, further comprising the step of reconstructing each said images from said master image.

29. The Method according to claim 28, further comprising the step of displaying said images using a stereoscopic display device.

30. The Method according to claim 29, further comprising the step of simultaneously displaying said images on a stereoscopic display device.

31. The Method according to claim 29, wherein said step of reconstructing comprises the steps of:

determining a range of wavelengths for each pixel within each said image; and determining an intensity level for each pixel within each said image.

32. Method for detecting a stereoscopic image comprising the steps of:

splitting light which arrives from different directions, using a lenticular lens layer, thereby producing at least two images, which are intertwined in a master image; and detecting said master image using a multiple wavelength detector;

reconstructing each said images from said master image;
wherein said step of reconstructing further comprises the steps of:

determining a range of wavelengths for each pixel within each said image;

determining an intensity level for each pixel within each said image;

selecting one of said pixels, associated with a predetermined range of wavelengths;

determining the pixels associated with another range of wavelengths, in the vicinity of said selected pixel;

calculating an approximated level of said other range of wavelengths at the location of the selected pixel; and repeating from said step of selecting.

33. Endoscope comprising:

lenticular lens layer, including a plurality of lenticular elements; and light sensor array, including a plurality of light sensors, wherein selected ones of said light sensors detect light at a predetermined range of wavelengths and wherein at least selected others of said light sensors detect light at at least another predetermined range of wavelengths;

a light illuminating unit, wherein said light illuminating unit surrounds said lenticular lens layer; and wherein each said lenticular elements is located in front of a selected group of said light sensors, thereby directing light from different directions to different light sensors within said selected group of said light sensors.

34. The endoscope according to claim 33, wherein said light sensor array is a color red-green-blue (RGB) sensor array.

35. The endoscope according to claim 33, wherein said light sensor array is a color cyan-yellow-magenta-green (CYMG) sensor array.

36. Endoscope comprising:

lenticular lens layer, including a plurality of lenticular elements; and light sensor array, including a plurality of light sensors, said light sensors detecting light at a predetermined range of wavelengths;

a light illuminating unit, wherein said light illuminating unit surrounds said lenticular lens layer; and wherein each said lenticular elements is located in front of a selected group of said light sensors, thereby directing light from different directions to different light sensors within said selected group of said light sensors.

37. The endoscope according either to either of claims 33 and 36, wherein each said lenticular element includes light directing means, which distinguish between at least two directions of light.

38. The endoscope according to either of claims 33 and 36, wherein each said lenticular element includes light directing means, which distinguish between four directions of light.

39. The endoscope according to either of claims 33 and 36, wherein each said lenticular element is shaped in a general semi-cylindrical shape.

40. The endoscope according to either of claims 33 and 36, wherein each said lenticular element is shaped in a general semi-sphere shape.

41. The endoscope according to either of claims 33 and 36, wherein each said selected group of said light sensors includes an even number of light sensors.

42. The endoscope according to either of claims 33 and 36, further comprising a light illuminating unit.

43. The endoscope according to claim 42, wherein said light illuminating unit surrounds said lenticular lens layer.

44. The endoscope according to claim 42, wherein said light illuminating unit comprises:

a light source;

a light dispersing unit; and light guiding means connected between said light source and said light dispersing unit, thereby guiding light from said light source to said light dispersing unit.

45. The endoscope according to claim 42, wherein said light illuminating unit produces light in a predetermined range of wavelengths.

46. The endoscope according to either of claims 33 and 36, further comprising a controller connected to said array of light sensors, wherein said controller produces an image for each said different directions, by combining data received from said light sensors respective of each said different directions.

47. The endoscope according to claim 46, further comprising a stereoscopic display unit, connected to said controller, for producing said image.

48. The endoscope according to claim 46, wherein said image is stereoscopic.

49. The endoscope according to claim 46, wherein said image is partially stereoscopic.

50. The endoscope according to either of claims 33 and 36, further comprising capture means, connected to said array of light sensors, for capturing data received from said light sensors.

51. The endoscope according to claim 50, further comprising a storage unit for storing said captured data.

52. The endoscope according to either of claims 33 and 36, wherein each said predetermined ranges of wavelengths is selected from the list consisting of:
   substantially visible red color light;
   substantially visible green color light;
   substantially visible blue color light;
   substantially visible cyan color light;
   substantially visible yellow color light;
   substantially visible magenta color light;
   substantially infra-red light;
   substantially ultra-violet light; and
   Visible light.

53. Endoscope comprising:
   lenticular lens layer, including a plurality of lenticular elements;
   light sensor array, including a plurality of light sensors, wherein selected ones of said light sensors detect light at a predetermined range of wavelengths and wherein at least selected others of said light sensors detect light at at least another predetermined range of wavelengths;
   a light illuminating unit, wherein said light illuminating unit comprises:
      a light source;
      a light dispersing unit; and
      light guiding means connected between said light source and said light dispersing unit, thereby guiding light from said light source to said light dispersing unit,
   wherein said light dispersing unit surrounds said lenticular lens layer;
   wherein each said lenticular elements is located in front of a selected group of said light sensors, thereby directing light from different directions to different light sensors within said selected group of said light sensors.

54. Endoscope comprising:
   lenticular lens layer, including a plurality of lenticular elements;
   light sensor array, including a plurality of light sensors, wherein selected ones of said light sensors detect light at a predetermined range of wavelengths and wherein at least selected others of said light sensors detect light at at least another predetermined range of wavelengths;
   a light illuminating unit, wherein said light illuminating unit produces at least two alternating beams of light, each said beams of light characterized as being in a different range of wavelengths;
   wherein each said lenticular elements is located in front of a selected group of said light sensors, thereby directing light from different directions to different light sensors within said selected group of said light sensors.

55. The endoscope according to claim 54, wherein each said predetermined ranges of wavelengths is selected from the list consisting of:
   substantially visible red color light;
   substantially visible green color light;
   substantially visible blue color light;
   substantially visible cyan color light;
   substantially visible yellow color light;
   substantially visible magenta color light;
   substantially infra-red light;
   substantially ultra-violet light; and
   Visible light.

56. The endoscope according to claim 54, further comprising a controller connected to said array of light sensors, wherein said controller produces an image for each combination of a selected one of said different directions and a selected one of said beams of light, by combining data received from said light sensors respective of each said different directions, with respect to the currently illuminating one of said beams of light.

57. The endoscope according to claim 56, further comprising a stereoscopic display unit, connected to said controller, for producing said image.

58. The endoscope according to claim 46, wherein said image is stereoscopic.

59. The endoscope according to claim 56, wherein said image is partially stereoscopic.

60. Method for detecting a stereoscopic image comprising the steps of:
   directing a plurality of time sequenced light beams at an object, each said light beams characterized by a different range of wavelengths;
   for each said light beams, splitting light which arrives from different directions, using a lenticular lens layer, thereby producing at least two images, which are intertwined in a master image; and
   detecting said master image;
   reconstructing each of said images from said master image, wherein said step of reconstructing comprises the steps of:
      determining a range of wavelengths for each pixel within each said image; and
      determining an intensity level for each pixel within each said image;
      selecting one of said pixels, associated with a predetermined range of wavelengths;
      determining the pixels associated with another range of wavelengths, in the vicinity of said selected pixel;
      calculating an approximated level of said other range of wavelengths at the location of the selected pixel; and
      repeating from said step of selecting.

61. The method according to claim 60, further comprising the step of displaying said images using a stereoscopic display device.

62. The method according to claim 61, further comprising the step of simultaneously displaying said images on a stereoscopic display device.

63. The method according to claims 27 or 60 wherein said stereoscopic image is partially stereoscopic.

64. Method for detecting a stereoscopic image comprising the steps of:
   splitting light that arrives from different directions, using a partially lenticular lens layer, thereby producing at least two images, which are intertwined in a master image; and detecting said master image;
   sequentially illuminating a detected area with alternating beams of light, of different ranges of wavelength; and
   associating said master image in time, with the currently illuminating ranges of wavelength.

65. Stereoscopic device comprising:

lenticular lens layer, including a plurality of lenticular elements; and light sensor array, including a plurality of light sensors, said light sensors detecting light at a predetermined range of wavelengths;

wherein each said lenticular elements is located in front of a selected group of said light sensors, thereby directing light from different directions to different light sensors within said selected group of said light sensors;

a light illuminating unit, wherein said light illuminating unit comprises:
  a light source;
  a light dispersing unit; and
  light guiding means connected between said light source and said light dispersing unit, thereby guiding light from said light source to said light dispersing unit, wherein said light dispersing unit surrounds said lenticular lens layer.

66. Stereoscopic device comprising:

light illuminating unit, wherein said light illuminating unit produces at least two alternating beams of light, each said beams of light characterized as being in a different range of wavelengths;

lenticular lens layer, including a plurality of lenticular elements;

light sensor array, including a plurality of light sensors, said light sensors detecting light at a predetermined range of wavelengths; and wherein each said lenticular elements is located in front of a selected group of said light sensors, thereby directing light from different directions to different light sensors within said selected group of said light sensors.

67. Endoscope comprising:

lenticular lens layer, including a plurality of lenticular elements;

light sensor array, including a plurality of light sensors, said light sensors detecting light at a predetermined range of wavelengths;

a light illuminating unit, wherein said light illuminating unit comprises:
  a light source;
  a light dispersing unit; and
  light guiding means connected between said light source and said light dispersing unit, thereby guiding light from said light source to said light dispersing unit, wherein said light dispersing unit surrounds said lenticular lens layer;

wherein each said lenticular elements is located in front of a selected group of said light sensors, thereby directing light from different directions to different light sensors within said selected group of said light sensors.

68. Endoscope comprising:

lenticular lens layer, including a plurality of lenticular elements;

light sensor array, including a plurality of light sensors, said light sensors detecting light at a predetermined range of wavelengths;

a light illuminating unit, wherein said light illuminating unit produces at least two alternating beams of light, each said beams of light characterized as being in a different range of wavelengths;

wherein each said lenticular elements is located in front of a selected group of said light sensors, thereby directing light from different directions to different light sensors within said selected group of said light sensors.

69. Method for detecting a stereoscopic image comprising the steps of:

splitting light that arrives from different directions, using a partially lenticular lens layer, thereby producing at least two images, which are intertwined in a master image; and detecting said master image;

reconstructing each of said images from said master image, wherein said step of reconstructing comprises the steps of:
  determining a range of wavelengths for each pixel within each said image; and
  determining an intensity level for each pixel within each said image;
  selecting one of said pixels, associated with a predetermined range of wavelengths;
  determining the pixels associated with another range of wavelengths, in the vicinity of said selected pixel;
  calculating an approximated level of said other range of wavelengths at the location of the selected pixel; and
  repeating from said step of selecting.

* * * * *